(12) United States Patent
Nishi

(10) Patent No.: US 12,460,389 B2
(45) Date of Patent: Nov. 4, 2025

(54) SHOVEL AND CONSTRUCTION SYSTEM

(71) Applicant: SUMITOMO CONSTRUCTION MACHINERY CO., LTD., Tokyo (JP)

(72) Inventor: Takashi Nishi, Chiba (JP)

(73) Assignee: SUMITOMO CONSTRUCTION MACHINERY CO., LTD, Tokyo (JP)

( * ) Notice: Subject to any disclaimer, the term of this patent is extended or adjusted under 35 U.S.C. 154(b) by 454 days.

(21) Appl. No.: 17/449,317

(22) Filed: Sep. 29, 2021

(65) Prior Publication Data

US 2022/0018096 A1 Jan. 20, 2022

Related U.S. Application Data

(63) Continuation of application No. PCT/JP2020/014696, filed on Mar. 30, 2020.

(30) Foreign Application Priority Data

Mar. 30, 2019 (JP) .................................. 2019-069472

(51) Int. Cl.
| | | |
|---|---|---|
| E02F 9/26 | (2006.01) | |
| E02F 9/22 | (2006.01) | |
| G06F 18/24 | (2023.01) | |
| G06F 18/2431 | (2023.01) | |
| G06N 3/04 | (2023.01) | |
| G06N 3/045 | (2023.01) | |

(52) U.S. Cl.
CPC .............. *E02F 9/261* (2013.01); *E02F 9/226* (2013.01); *G06F 18/2431* (2023.01); *G06N 3/045* (2023.01)

(58) Field of Classification Search
CPC . E02F 9/261; E02F 9/226; E02F 3/435; E02F 9/2033; E02F 9/24; E02F 9/20; E02F 9/123; E02F 9/26; G06F 18/2431; G06N 3/045; G06N 3/084; G06N 20/10; G06V 10/82; G06V 20/52; G06V 40/103
See application file for complete search history.

(56) References Cited

U.S. PATENT DOCUMENTS

| | | |
|---|---|---|
| 9,113,047 B2 | 8/2015 | Onuma et al. |
| 9,836,938 B2 | 12/2017 | Kiyota |

(Continued)

FOREIGN PATENT DOCUMENTS

| | | |
|---|---|---|
| JP | H11-116185 | 4/1999 |
| JP | 2004-343297 | 12/2004 |

(Continued)

OTHER PUBLICATIONS

International Search Report for PCT/JP2020/014696 mailed on Jun. 16, 2020.

*Primary Examiner* — Rodney A Butler
(74) *Attorney, Agent, or Firm* — IPUSA, PLLC

(57) ABSTRACT

A shovel includes a lower traveling structure, an upper swing structure, a non-volatile storage device, an information obtaining device that obtains information related to construction, and a controller that controls a sound output device. The controller is configured to determine a dangerous situation based on information obtained by the information obtaining device. The shovel may be configured to display information on a display device related to the dangerous situation determined to occur.

8 Claims, 21 Drawing Sheets

(56) References Cited

U.S. PATENT DOCUMENTS

| | | | | |
|---|---|---|---|---|
| 2003/0116330 A1* | 6/2003 | Manor | ............ | A01B 33/00 37/189 |
| 2012/0041663 A1* | 2/2012 | Suzuki | ............ | E02F 9/267 701/102 |
| 2013/0222573 A1* | 8/2013 | Onuma | ............ | E02F 9/24 348/82 |
| 2013/0345857 A1* | 12/2013 | Lee | ............ | B66C 13/48 700/229 |
| 2014/0052349 A1 | 2/2014 | Tsukane | | |
| 2014/0343820 A1 | 11/2014 | Kim | | |
| 2017/0073925 A1* | 3/2017 | Friend | ............ | E02F 9/261 |
| 2017/0191243 A1 | 7/2017 | Sharp et al. | | |
| 2017/0351928 A1* | 12/2017 | Yamanaka | ............ | G06V 20/597 |
| 2018/0174291 A1* | 6/2018 | Asada | ............ | G06T 7/0004 |
| 2018/0258617 A1* | 9/2018 | Leslie | ............ | E02F 9/226 |
| 2018/0347147 A1 | 12/2018 | Doi et al. | | |
| 2019/0137991 A1* | 5/2019 | Agarwal | ............ | G01C 21/383 |
| 2019/0188866 A1* | 6/2019 | Mehrseresht | ............ | G06T 7/292 |
| 2019/0232955 A1* | 8/2019 | Grimm | ............ | G06V 10/803 |
| 2019/0302794 A1* | 10/2019 | Kean | ............ | E02F 9/262 |
| 2019/0352885 A1* | 11/2019 | Kurokami | ............ | B66C 23/88 |
| 2020/0175339 A1* | 6/2020 | Viswanathan | ............ | G06V 20/56 |

FOREIGN PATENT DOCUMENTS

| | | |
|---|---|---|
| JP | 2006-188353 | 7/2006 |
| JP | 2008-248613 | 10/2008 |
| JP | 2013-151830 | 8/2013 |
| JP | 2014-183500 | 9/2014 |
| JP | 5667638 | 2/2015 |
| JP | 2018-081549 | 5/2018 |
| JP | 2019-002242 | 1/2019 |
| WO | 2012/157603 | 11/2012 |

* cited by examiner

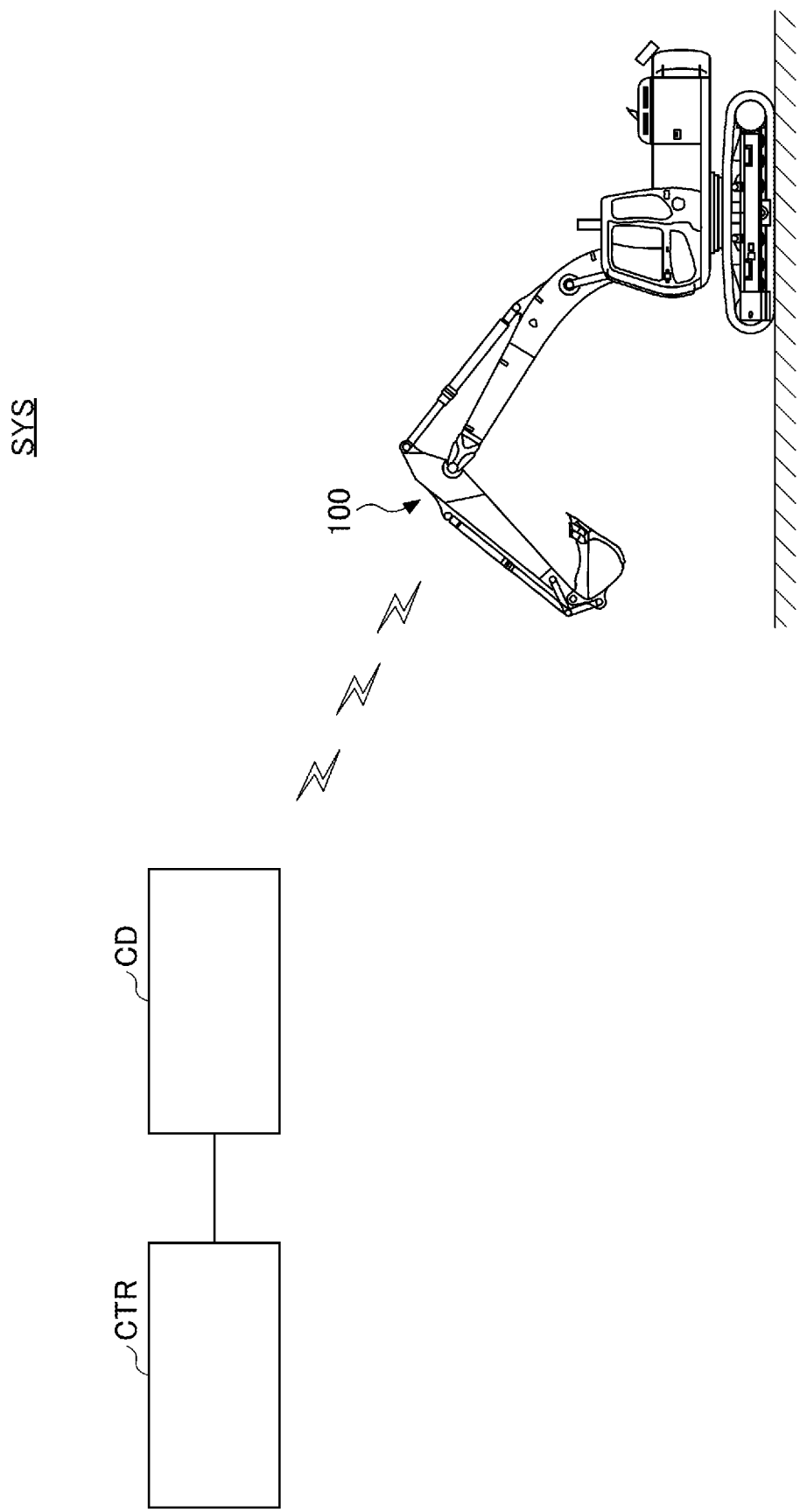

SHOVEL AND CONSTRUCTION SYSTEM

CROSS-REFERENCE TO RELATED APPLICATIONS

This patent application is a continuation of International Application PCT/JP2020/014696, filed on Mar. 30, 2020, and designated the U.S., which is based on and claims priority to Japanese Patent Application No. 2019-069472 filed on Mar. 30, 2019. The entire contents of these applications are incorporated herein by reference.

BACKGROUND OF THE INVENTION

1. Field of the Invention

The present disclosure relates to shovels and construction systems.

2. Description of the Related Art

A shovel is configured to be able to detect a person present in an area based on an image obtained by a camera attached to an upper swing structure.

However, although the shovel described above is able to detect a person who has entered within a predetermined range set around the shovel, the shovel described above merely compares a relative positional relationship between the shovel and the person who has entered and does not grasp a situation at a work site.

In consideration of the above, a machine or system capable of grasping the situation at the work site is desired to be provided.

SUMMARY OF THE INVENTION

A shovel according to the embodiment of the present disclosure includes a lower traveling structure, an upper swing structure rotatably mounted on the lower traveling structure, a storage provided in the upper swing structure, an information obtaining device that obtains information related to construction, and a processing circuitry that controls a notification device, wherein the processing circuitry determines a dangerous situation based on information obtained by the information obtaining device.

The shovel described above is capable of preventing a dangerous situation.

BRIEF DESCRIPTION OF THE DRAWINGS

FIG. 21 is a schematic view illustrating another example of a construction system.

DESCRIPTION OF THE PREFERRED EMBODIMENTS

Figure 1:
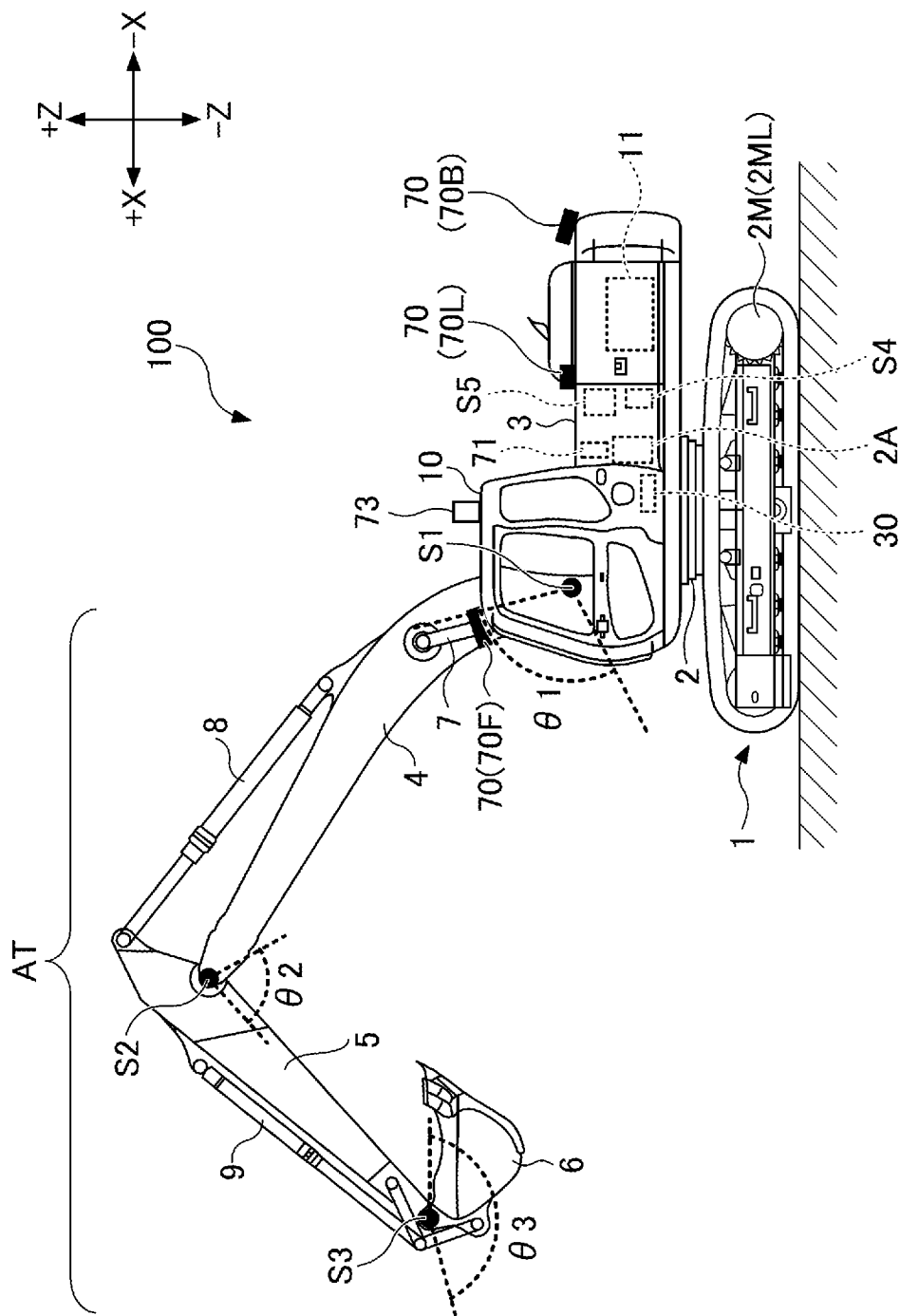
FIG. 1 is a side view of a shovel according to an embodiment of the present disclosure.
Figure 2:
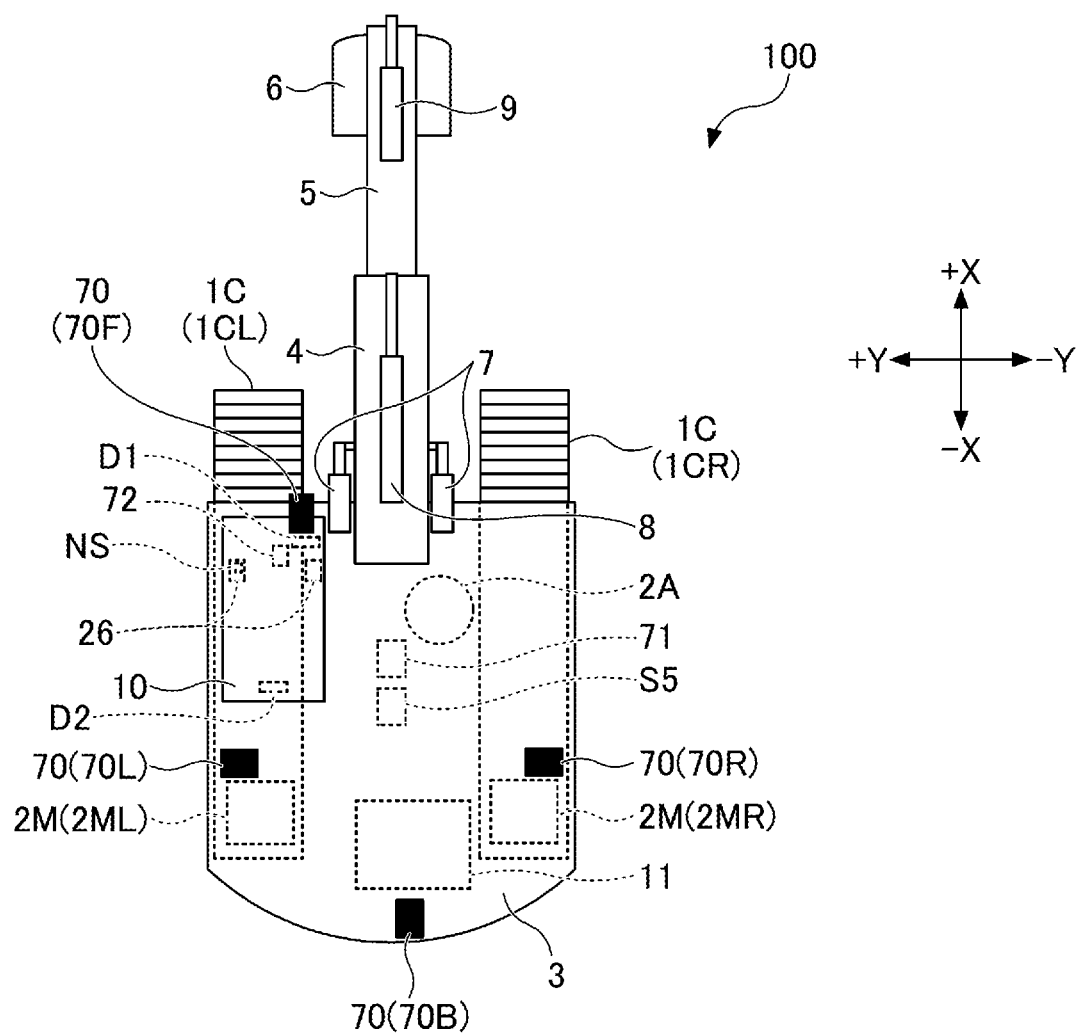
FIG. 2 is a top view of the shovel of FIG. 1.
Figure 3:
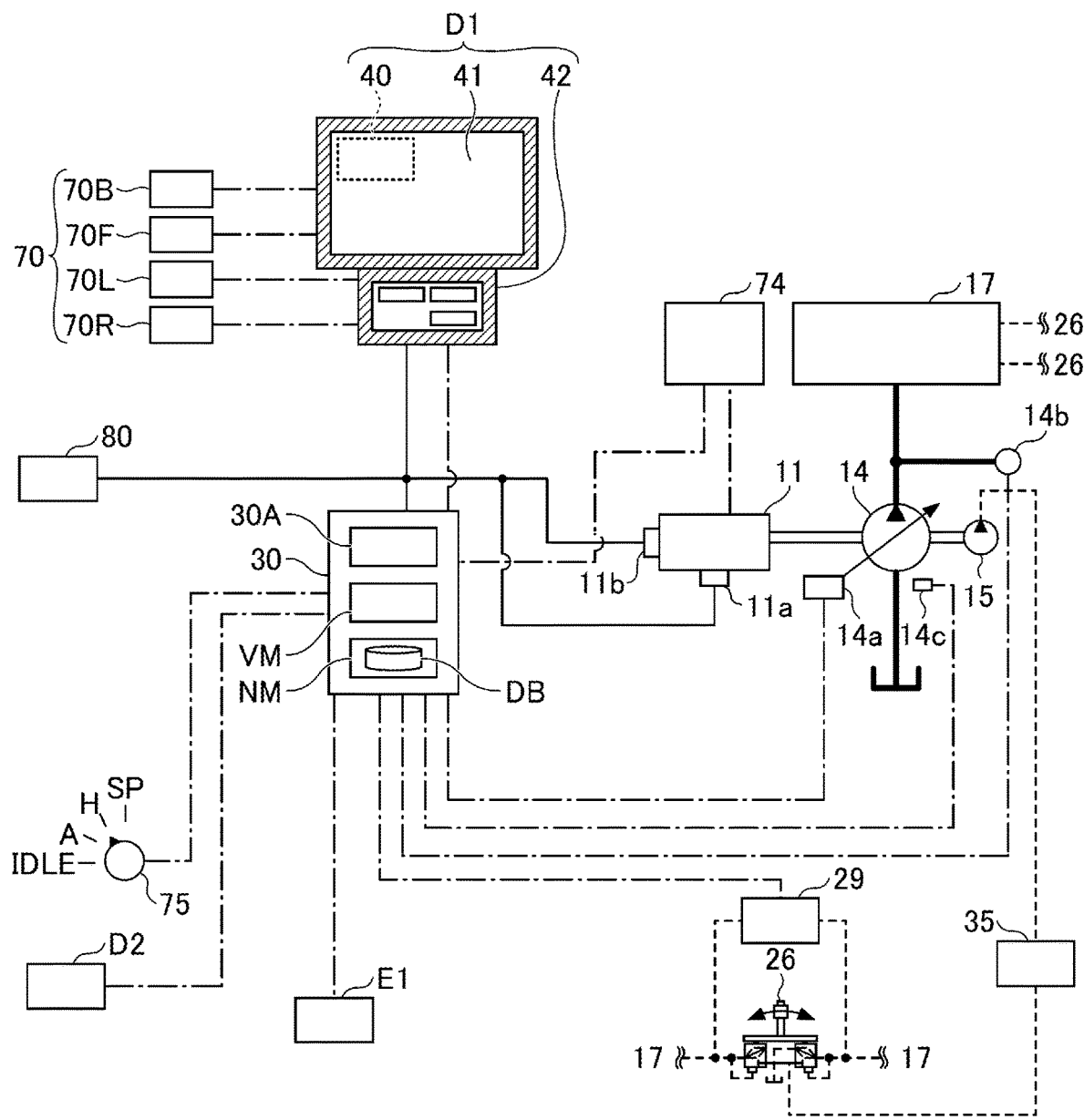
FIG. 3 is a diagram illustrating an example configuration of a hydraulic system installed in the shovel of FIG. 1.

First, a shovel 100 as an excavator according to an embodiment of the present disclosure will be described with reference to FIG. 1 to FIG. 3. FIG. 1 is a side view of the shovel 100. FIG. 2 is a top view of the shovel 100. FIG. 3 illustrates an example configuration of a basic system installed in the shovel 100.

According to the present embodiment, a lower traveling structure 1 of the shovel 100 includes crawlers 1C. The crawlers 1C are driven by travel hydraulic motors 2M serving as travel actuators mounted on the lower traveling structure 1. Specifically, as illustrated in FIG. 2, the crawlers 1C include a left crawler 1CL and a right crawler 1CR, the travel hydraulic motor 2M includes a left travel hydraulic motor 2ML and a right travel hydraulic motor 2MR. The left crawler 1CL is driven by the left travel hydraulic motor 2ML. The right crawler 1CR is driven by the right travel hydraulic motor 2MR.

An upper swing structure 3 is rotatably mounted on the lower traveling structure 1 via a swing mechanism 2. The swing mechanism 2 is driven by a swing hydraulic motor 2A serving as a swing actuator mounted on the upper swing structure 3. However, the swing actuator may be a swing motor generator as an electric actuator.

A boom 4 is attached to the upper swing structure 3. An arm 5 is attached to the distal end of the boom 4. A bucket 6 serving as an end attachment is attached to the distal end of the arm 5. The boom 4, the arm 5, and the bucket 6 constitute an excavation attachment AT that is an example of an attachment. The boom 4 is driven by a boom cylinder 7. The arm 5 is driven by an arm cylinder 8. The bucket 6 is driven by a bucket cylinder 9.

The boom 4 is supported to be pivotable upward and downward relative to the upper swing structure 3. A boom angle sensor S1 is attached to the boom 4. The boom angle sensor S1 can detect a boom angle θ1 that is the pivot angle of the boom 4. The boom angle θ1 is, for example, a rise angle from the lowest position of the boom 4. Therefore, the boom angle θ1 is maximized when the boom 4 is raised to the greatest extent possible.

The arm 5 is pivotably supported relative to the boom 4. An arm angle sensor S2 is attached to the arm 5. The arm angle sensor S2 can detect an arm angle θ2 that is the pivot angle of the arm 5. The arm angle θ2 is, for example, an opening angle from the most closed position of the arm 5. Therefore, the arm angle θ2 is maximized when the arm 5 is opened to the greatest extent possible.

The bucket 6 is pivotably supported relative to the arm 5. A bucket angle sensor S3 is attached to the bucket 6. The bucket angle sensor S3 can detect a bucket angle θ3 that is the pivot angle of the bucket 6. The bucket angle θ3 is, for example, an opening angle from the most closed position of the bucket 6. Therefore, the bucket angle θ3 is maximized when the bucket 6 is opened to the greatest extent possible.

According to the embodiment of FIG. 1, each of the boom angle sensor S1, the arm angle sensor S2, and the bucket angle sensor S3 is composed of a combination of an acceleration sensor and a gyroscope, but may alternatively be composed of an acceleration sensor alone. Further, the boom angle sensor S1 may also be a stroke sensor attached to the boom cylinder 7, a rotary encoder, a potentiometer, an inertial measurement unit, or the like. The same is true for the arm angle sensor S2 and the bucket angle sensor S3.

A cabin 10 serving as a cab is provided and a power source such as an engine 11 is mounted on the upper swing structure 3. Further, a space recognition device 70, an orientation detector 71, a positioning device 73, a machine body tilt sensor S4, a swing angular velocity sensor S5, etc., are attached to the upper swing structure 3. An operating device 26, an operating pressure sensor 29, a controller 30, an information input device 72, a display D1, a sound output device D2, and so on, are provided in the cabin 10. In this specification, for convenience, the side of the upper swing structure 3 on which the excavation attachment AT (+X side) is attached is referred to as the front side, and the side of the upper swing structure 3 on which a counterweight is attached (−X side) is referred to as the back side.

The operating device 26 is a device that the operator uses to operate actuators. The operating device 26 includes, for example, an operating lever and an operating pedal. The actuators include at least one of a hydraulic actuator or an electric actuator. According to the present embodiment, as illustrated in FIG. 3, the operating device 26 is configured to be able to supply hydraulic oil discharged by the pilot pump 15 to a pilot port of a corresponding control valve in the control valve unit 17 via a pilot line. The pressure of the hydraulic oil (pilot pressure) supplied to each of the pilot ports is a pressure corresponding to the operation direction and the operation amount of the operating device 26 corresponding to each of the hydraulic actuators. The operating device 26 may be an electrically controlled type instead of such a pilot pressure type. In this case, the control valve in the control valve unit 17 may be an electromagnetic solenoid type spool valve.

Specifically, the operating device 26 includes a left operating lever and a right operating lever, as illustrated in FIG. 2. The left operating lever is used for turning and operating the arm 5. The right operating lever is used for operating the boom 4 and the bucket 6.

The operating pressure sensor 29 is configured to be able to detect the details of the operator's operation on the operating device 26. According to the present embodiment, the operating pressure sensor 29 detects the direction of operation and the amount of operation of the operating device 26 corresponding to each actuator in the form of pressure (operating pressure), and outputs a detected value to the controller 30. The details of the operation of the operating device 26 may also be detected using a sensor other than an operating pressure sensor.

Specifically, the operating pressure sensor 29 includes a left operating pressure sensor and a right operating pressure sensor. The left operating pressure sensor detects, in the form of pressure, each of the details of the operator's forward or backward operation of the left operating lever and the operator's rightward or leftward operation of the left operating lever, and outputs a detected value to the controller 30. Examples of the details of operation include the direction of lever operation and the amount of lever operation (the angle of lever operation). The same applies to the right operating lever.

The space recognition device 70 is configured to obtain information related to a three-dimensional space surrounding the shovel 100. Further, the space recognition device 70 may be configured to calculate a distance from the space recognition device 70 or the shovel 100 to the object recognized by the space recognition device 70. The space recognition device 70 is, for example, an ultrasonic sensor, a millimeter wave radar, a monocular camera, a stereo camera, a LIDAR, a distance image sensor, or an infrared sensor. According to the example, the space recognition device 70 includes a front camera 70F attached to the front end of the upper surface of the cabin 10, a back camera 70B attached to the back end of the upper surface of the upper swing structure 3, a left camera 70L attached to the left end of the upper surface of the upper swing structure 3, and a right camera 70R attached to the right end of the upper surface of the upper swing structure 3. The front camera 70F may be omitted.

The space recognition device 70 is, for example, a monocular camera having an image sensor such as a CCD or a CMOS, and outputs a captured image to the display D1. The space recognition device 70 may not only use the captured image, but may also transmit, when the LIDAR, the millimeter wave radar, the ultrasonic sensor, a laser radar, or the like is used, a large number of signals (laser beam, etc.) toward the object and receive the signal reflected from the object to detect the distance and direction of the object from the reflected signal.

The space recognition device 70 may be configured to detect an object present around the shovel 100. Examples of the object include a terrain shape (inclination or hole, etc.), a wire, a pole, a person, an animal, a vehicle, a construction machine, a building, a wall, a helmet, a safety vest, work clothes, or a predetermined mark on the helmet. The space recognition device 70 may be configured to be able to identify at least one of a type, a location, a shape, or the like of the object. The space recognition device 70 may be configured to distinguish between a person and an object other than a person.

The orientation detector 71 detects information on the relative relationship between the orientation of the upper swing structure 3 and the orientation of the lower traveling structure 1. The orientation detector 71 may be constituted of, for example, a combination of a geomagnetic sensor attached to the lower traveling structure 1 and a geomagnetic sensor attached to the upper swing structure 3. The orientation detector 71 may also be constituted of a combination of a GNSS receiver attached to the lower traveling structure 1 and a GNSS receiver attached to the upper swing structure 3. The orientation detector 71 may also be a rotary encoder, a rotary position sensor, or the like. According to a configuration where the upper swing structure 3 is driven to swing by a swing motor generator, the orientation detector 71 may include a resolver. The orientation detector 71 may be attached to, for example, a center joint provided in relation to the swing mechanism 2 that achieves relative rotation between the lower traveling structure 1 and the upper swing structure 3.

The orientation detector 71 may also include a camera attached to the upper swing structure 3. In this case, the orientation detector 71 performs known image processing on an image obtained by the camera attached to the upper swing structure 3 (an input image) to detect an image of the lower traveling structure 1 included in the input image. The orientation detector 71 may identify the longitudinal direction of the lower traveling structure 1 by detecting an image of the lower traveling structure 1 using a known image recognition technique and derive an angle formed between the direction of the longitudinal axis of the upper swing structure 3 and the longitudinal direction of the lower traveling structure 1. The direction of the longitudinal axis of the upper swing structure 3 is derived from the input image since the relationship between the direction of the optical axis of the camera and the direction of the longitudinal axis of the upper swing structure 3 is known. Because the crawlers 10 protrude from the upper swing structure 3, the orientation detector 71 can identify the longitudinal direction of the lower traveling structure 1 by detecting an image of the crawlers 1C. The orientation detector 71 may be integrated into the controller 30.

The information input device 72 is configured to enable the shovel operator to input information to the controller 30. According to the present embodiment, the information input device 72 is a switch panel installed near an image display portion 41 of the display D1. The information input device 72 may also be a touchscreen placed over the image display portion 41 of the display D1, a dial or a cross shaped button provided at the tip end of an operation lever, or a sound input device such as a microphone placed in the cabin 10. Further, the information input device 72 may also be a communications device. In this case, the operator can input information to the controller 30 via a communications terminal such as a smartphone.

The positioning device 73 is configured to measure a current position. According to the present embodiment, the positioning device 73 is a GNSS receiver, and detects the position of the upper swing structure 3 to output a detection value to the controller 30. The positioning device 73 may also be a GNSS compass. In this case, the positioning device 73 can detect the position and the orientation of the upper swing structure 3.

The machine body tilt sensor S4 is configured to detect the tilt of the upper swing structure 3 relative to a predetermined plane. According to the present embodiment, the machine body tilt sensor S4 is an acceleration sensor that detects the tilt angles of the upper swing structure 3 about its longitudinal axis (roll angle) and lateral axis (pitch angle) relative to a horizontal plane. Each of the longitudinal axis and the lateral axis of the upper swing structure 3, for example, passes through a shovel central point that is a point on the swing axis of the shovel 100, and crosses each other at right angles.

The swing angular velocity sensor S5 is configured to detect the swing angular velocity of the upper swing structure 3. According to the present embodiment, the swing angular velocity sensor S5 is a gyroscope. The swing angular velocity sensor S5 may also be a resolver, a rotary encoder, or the like. The swing angular velocity sensor S5 may also detect swing speed. The swing speed may be calculated from swing angular velocity.

In the following, at least one of the boom angle sensor S1, the arm angle sensor S2, the bucket angle sensor S3, the machine body tilt sensor S4, or the swing angular velocity sensor S5 is also referred to as a "pose detector." The pose of the excavation attachment AT is detected based on the respective outputs of the boom angle sensor S1, the arm angle sensor S2, and the bucket angle sensor S3, for example.

The display D1 is an example of a notification device and is configured to be able to display various information. According to the present embodiment, the display D1 is a liquid crystal display installed in the cabin 10. The display D1 may also be the display of a communications terminal such as a smartphone.

The sound output device D2 is another example of a notification device is configured to be able to output a sound. The sound output device D2 includes at least one of a device that outputs a sound to the operator in the cabin 10 or a device that outputs a sound to an operator outside the cabin 10. The sound output device D2 may be a loudspeaker of a communications terminal.

The controller 30 (control device) is processing circuitry configured to control the shovel 100. According to the present embodiment, the controller 30 is constituted of a computer including a CPU, a volatile storage device VM (see FIG. 3), a non-volatile storage device NM (see FIG. 3), and the like. The controller 30 reads the program corresponding to each function from the non-volatile storage device NM, loads it into the volatile storage device VM, and causes the CPU to execute the corresponding processing. Examples of each function include a machine guidance function for guiding a manual operation of the shovel 100 performed by the operator, and a machine control function for assisting the operator in manually operating the shovel 100 or for operating the shovel 100 automatically or autonomously.

The controller 30 may include a contact avoidance function for automatically or autonomously operating or stopping the shovel 100 in order to avoid contact between an object present in the monitoring area around the shovel 100 and the shovel 100. Monitoring of objects around the shovel 100 may be performed not only within the monitoring area but also outside the monitoring area. At this time, the controller 30 may be configured to detect the type of the object and the location of the object.

Next, an example configuration of the basic system installed in the shovel 100 of FIG. 1 is described with reference to FIG. 3. In FIG. 3, a mechanical power transmission system is indicated by a double line, a hydraulic oil line is indicated by a thick solid line, a pilot line is indicated by a dashed line, a power line is indicated by a thin solid line, and an electric control line is indicated by a long dash-dot line.

The basic system mainly includes the engine 11, a main pump 14, a pilot pump 15, the control valve unit 17, the operating device 26, an operating pressure sensor 29, the controller 30, a switching valve 35, an engine control device 74, an engine rotation adjustment dial 75, a rechargeable battery 80, the display D1, the sound output device D2, an information obtaining device E1, and the like.

The engine 11 is a diesel engine that employs isochronous control for maintaining the engine rotation speed constant regardless of increases or decreases in load. A fuel injection amount, fuel injection timing, boost pressure, and the like in the engine 11 are controlled by the engine control device 74.

The rotation shaft of the engine 11 is connected to the respective rotation shafts of the main pump 14 and the pilot pump 15. The main pump 14 is connected to the control valve unit 17 via a hydraulic oil line. The pilot pump 15 is connected to the operating device 26 via a pilot line. However, the pilot pump 15 may be omitted. In this case, the function carried out by the pilot pump 15 may be implemented by the main pump 14. That is, the main pump 14 may have not only a function of supplying the hydraulic oil to the control valve unit 17, but also a function of supplying the hydraulic oil to the operating device 26 or the like after reducing the pressure of the hydraulic oil by using a throttle or the like.

The control valve unit 17 is a hydraulic controller that controls the hydraulic system in the shovel 100. The control valve unit 17 is connected to a hydraulic actuator such as the left travel hydraulic motor 2ML, the right travel hydraulic motor 2MR, the boom cylinder 7, the arm cylinder 8, the bucket cylinder 9, and the swing hydraulic motor 2A.

Specifically, the control valve unit 17 includes multiple spool valves corresponding to each hydraulic actuator. Each spool valve is configured to be displaceable according to the pilot pressure so that an opening area of a PC port and an opening area of a CT port can be increased or decreased. The PC port is a port that forms a part of an oil passage for connecting the main pump 14 and the hydraulic actuator. The CT port is a port that forms a part of an oil passage for connecting the hydraulic actuator and a hydraulic oil tank.

The switching valve 35 is configured to be able to switch between the enabled state and the disabled state of the operating device 26. The enabled state of the operating device 26 is a state in which the operator can operate the hydraulic actuator using the operating device 26. The disabled state of the operating device 26 is a state in which the operator cannot operate the hydraulic actuator using the operating device 26. In the present embodiment, the switching valve 35 is a gate lock valve as a solenoid valve configured to operate in response to a command from the controller 30. Specifically, the switching valve 35 is arranged on the pilot line connecting the pilot pump 15 and the operating device 26. The switching valve 35 is configured to be able to switch cut-off and opening of the pilot line in response to the command from the controller 30. For example, the operating device 26 becomes in the enabled state when the gate lock lever (not illustrated) is pulled up to open the gate lock valve and becomes in the disabled state when the gate lock lever is pushed down to close the gate lock valve.

The display D1 includes a control unit 40, the image display portion 41, and an operation unit 42 as an input unit. The control unit 40 is configured to be able to control the image displayed on the image display portion 41. In the present embodiment, the control unit 40 is constituted of a computer including a CPU, a volatile storage device, a non-volatile storage device, and the like. In this case, the control unit 40 reads the program corresponding to each functional element from the non-volatile storage device, loads it into the volatile storage device, and causes the CPU to execute the corresponding processing. Each functional element may be constituted of hardware or may be constituted of a combination of software and hardware. Further, the image displayed on the image display portion 41 may be controlled by the controller 30 or the space recognition device 70.

In the example illustrated in FIG. 3, the operation unit 42 is a panel including a hardware switch. The operation unit 42 may be a touch panel. The display D1 operates by receiving power supplied from the rechargeable battery 80. For example, the rechargeable battery 80 is charged with electricity generated by an alternator 11a. The power of the rechargeable battery 80 is also supplied to the controller 30 and the like. For example, a starter 11b of the engine 11 is driven by the power from the rechargeable battery 80 to start the engine 11.

The engine control device 74 transmits data regarding the state of the engine 11, such as a cooling water temperature, to the controller 30. A regulator 14a of the main pump 14 transmits data regarding the tilt angle of a swash plate to the controller 30. A discharge pressure sensor 14b transmits data regarding the discharge pressure of the main pump 14 to the controller 30. An oil temperature sensor 14c provided in the oil passage between the hydraulic oil tank and the main pump 14 transmits data regarding the temperature of the hydraulic oil flowing through the oil passage to the controller 30. The controller 30 is able to store such data in the volatile storage device VM to transmit to the display D1 as necessary.

The engine rotation adjustment dial 75 is a dial for adjusting the rotation speed of the engine 11. The engine rotation adjustment dial 75 transmits data regarding the setting state of the rotation speed of the engine to the controller 30. The engine rotation adjustment dial 75 is configured to be able to switch the rotation speed of the engine in four levels: SP mode, H mode, A mode, and IDLE mode. The SP mode is a rotation speed mode selected when it is desired to prioritize workload, and uses the highest engine rotation speed. The H mode is a rotation speed mode selected when it is desired to satisfy both workload and fuel efficiency, and uses the second highest engine rotation speed. The A mode is a rotation speed mode selected when it is desired to operate the shovel 100 with low noise while prioritizing fuel efficiency, and uses the third highest engine rotation speed. The IDLE mode is a rotation speed mode selected when the engine 11 is desired to be an idling state, and uses the lowest engine rotation speed. The engine 11 is controlled so as to be constant at the engine rotation speed corresponding to the speed mode set by the engine rotation adjustment dial 75.

The sound output device D2 is configured to attract attention of a person involved in a work of the shovel 100. The sound output device D2 may include, for example, a combination of an indoor alarm device and an outdoor alarm device. The indoor alarm device is a device for calling the attention of the operator of the shovel 100 in the cabin 10, and includes, for example, at least one of a speaker, a vibration generator, or a light emitting device provided in the cabin 10. The indoor alarm device may be the display D1 as an example of the notification device. The outdoor alarm device is a device for calling the attention of an operator working around the shovel 100, and includes, for example, at least one of the speaker or the light emitting device provided outside the cabin 10. The speaker as the outdoor alarm device includes, for example, a travel alarm device attached to a bottom surface of the upper swing structure 3. Further, the outdoor alarm device may be the light emitting device provided on the upper swing structure 3. The outdoor alarm device may be omitted. For example, when the space recognition device 70 functioning as an object detection device detects a predetermined object, the sound output device D2 may notify a person involved in the work of the shovel 100 that the predetermined object is detected. Further, the outdoor alarm device may be a portable information terminal device carried by the operator outside the cabin 10. The portable information terminal device is, for example, a smartphone, a tablet terminal, a smart watch, a helmet with a speaker, or the like.

The notification device may be installed outside the shovel 100. The notification device may be attached to, for example, a pole or a steel tower installed at the work site.

In the example illustrated in FIG. 3, the controller 30 receives signals outputted from at least one of the information obtaining devices E1 and performs various operations to output a control command to at least one of the display D1 or the sound output device D2.

The information obtaining device E1 is configured to be able to obtain information related to construction. In the present embodiment, the information obtaining device E1 includes at least one of the boom angle sensor S1, the arm angle sensor S2, the bucket angle sensor S3, the machine body tilt sensor S4, the swing angular velocity sensor S5, a boom rod pressure sensor, a boom bottom pressure sensor, an arm rod pressure sensor, an arm bottom pressure sensor, a bucket rod pressure sensor, a bucket bottom pressure sensor, a boom cylinder stroke sensor, an arm cylinder stroke sensor, a bucket cylinder stroke sensor, a discharge pressure sensor, the operating pressure sensor 29, the space recognition device 70, the orientation detector 71, the information input device 72, the positioning device 73, or a communication device. For example, the information obtaining device E1 obtains at least one of information related to the shovel 100, such as a boom angle, an arm angle, a bucket angle, a body inclination angle, a swivel angular velocity, a boom rod pressure, a boom bottom pressure, an arm rod pressure, an arm bottom pressure, a bucket rod pressure, a bucket bottom pressure, a boom stroke amount, an arm stroke amount, a bucket stroke amount, a discharge pressure of the main pump 14, an operating pressure of the operating device 26, information regarding three-dimensional space around the shovel 100, information related to a relative relationship between the direction of the upper swing structure 3 and the direction of the lower traveling structure 1, information input to the controller 30, information related to the present position, or the like. Further, the information obtaining device E1 may obtain information from another construction machine, an air vehicle, or the like. The air vehicle is, for example, a multicopter or an airship that obtains information about the work site. Further, the information obtaining device E1 may obtain work environment information. The work environment information includes, for example, information on at least one such as soil and sand characteristics, weather, altitude, and the like.

The controller 30 mainly includes a danger determining unit 30A as a functional element. The danger determining unit 30A may be configured by hardware or software. Specifically, the danger determining unit 30A is configured to be able to determine whether a dangerous situation will occur based on the information obtained by the information obtaining device E1 and the information stored in the danger information database DB. The danger information database DB is stored in, for example, the non-volatile storage device NM in the controller 30. As another example, the danger information database DB may be provided in a management device 200 described later and may be configured to be able to communicate with the shovel 100 via a communication network.

The danger information database DB is a collection of information systematically configured so that information related to the dangerous situation that may occur at the work site can be searched. The danger information database DB stores information related to the dangerous situation, for example, caused by a location of a hole to be excavated by the shovel 100 and the temporary placement location of the gutter block buried in the hole. Specifically, the danger information database DB defines at least one of the conditions of the dangerous situation and the danger level by using a depth of the hole excavated by the shovel 100, a volume of the gutter block, a distance from the edge of the hole to the gutter block, and the like.

Figure 4:
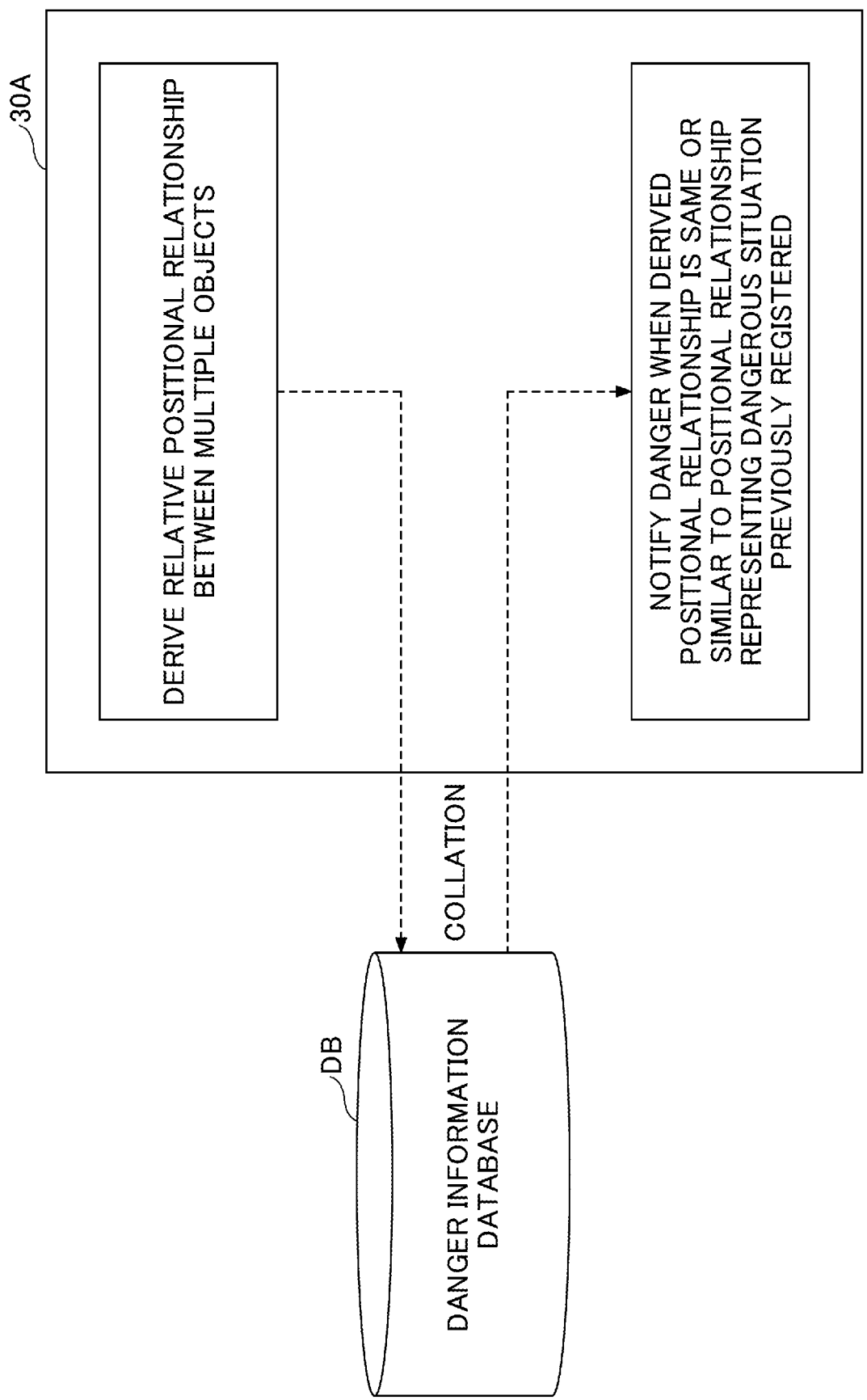
FIG. 4 is a conceptual diagram illustrating an example of a relationship between a danger determining unit and danger information database.

Specifically, as illustrated in FIG. 4, for example, the danger determining unit 30A derives a relative positional relationship between multiple objects, such as the hole excavated by the shovel 100 and the gutter block, as input information. FIG. 4 is a conceptual diagram illustrating an example of the relationship between the danger determining unit 30A and the danger information database DB. The danger determining unit 30A collates the derived input information with the reference information corresponding to the input information stored in the danger information database DB. In the present example, the reference information corresponding to the input information is, for example, the reference information associated with the hole excavated by the shovel 100 and the gutter block among the plurality of reference information. The danger determining unit 30A determines that a dangerous situation will occur, when the situation represented by the input information is determined to be the same or similar to the situation represented by the reference information.

More specifically, the danger determining unit 30A derives the depth of the hole excavated by the shovel 100, the volume of the gutter block, the distance from the edge of the hole to the gutter block, and the like as input information, based on the information obtained by the information obtaining device E1. The danger determining unit 30A collates the derived input information with the reference information representing the dangerous situation stored in the danger information database DB. The danger determining unit 30A determines that the dangerous situation will occur, when the situation represented by the input information is determined to be the same or similar to the situation represented by the reference information. The danger determining unit 30A collates the input information with the reference information indicating a non-dangerous situation to determine whether the situation represented by the input information is the same or is similar to the situation represented by the reference information. The danger determining unit 30A may determine that the dangerous situation will occur, when the input information is determined to be the same or similar to the situation represented by the reference information. Further, the danger determining unit 30A may use information related to soil and sand characteristics or information related to weather to determine whether a dangerous situation will occur.

Figure 5:
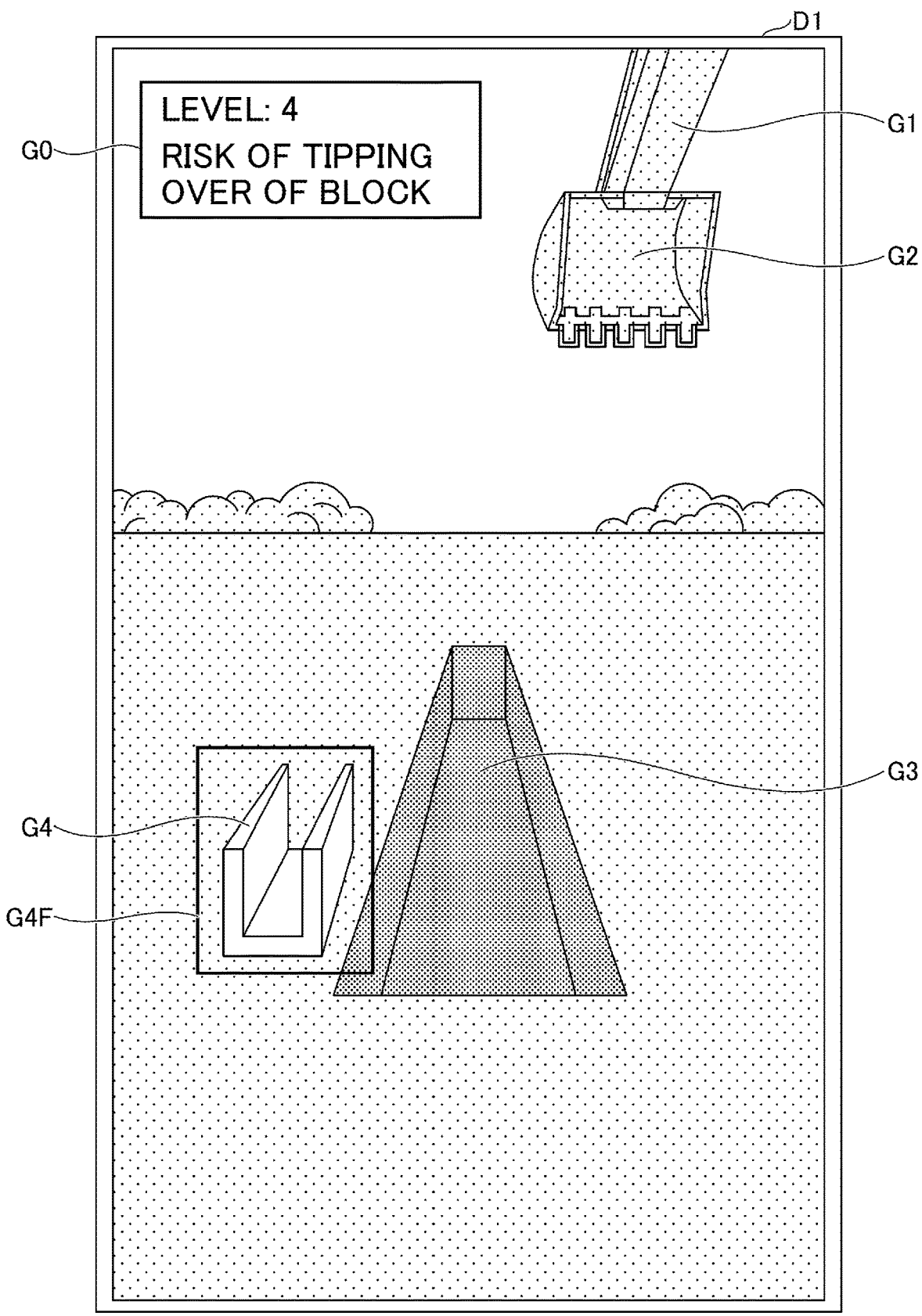
FIG. 5 is a diagram illustrating a display example of an input image.

For example, the danger determining unit 30A determines that the dangerous situation will occur, when the positional relationship illustrated in FIG. 5 is recognized based on the input image obtained by the front camera 70F. The front camera 70F is an example of the information obtaining device E1.

FIG. 5 illustrates an example of the input image, displayed on the display D1, obtained by the front camera 70F. The displayed input image includes a message window G0, an image G1 of the arm 5, an image G2 of the bucket 6, an image G3 of the hole excavated by the shovel 100, an image G4 of the gutter block temporarily placed near the hole, and a frame image G4F surrounding the image G4. The message window G0 indicates that the current danger level is level 4 and the cause is "risk of tipping over of a block."

The danger determining unit 30A recognizes the presence of the gutter block and the hole excavated by the shovel 100 by performing image processing on the input image, and derives the distance between the gutter block and the edge of the hole. The danger determining unit 30A determines that the dangerous situation is occurring when the distance between the gutter block and the edge of the hole is determined to be less than a threshold value stored in the danger information database DB.

When the dangerous situation is determined to occur, the danger determining unit 30A activates the notification device to notify the outside of the risk that the dangerous situation may occur. In the present embodiment, the danger determining unit 30A operates the display D1 and the indoor alarm device to notify the operator of the shovel 100 of the risk that the dangerous situation may occur. Further, the danger determining unit 30A may activate the outdoor alarm device to notify the operator working around the shovel 100 of the risk that the dangerous situation may occur. At this time, the result of determining whether the dangerous situation will occur may be further changed depending on at least one of a central location of the gutter block, the size of the gutter block (width, height, length), the size of the hole (width, height, length), or the like. Therefore, the danger determining unit 30A may gradually change the danger level (the degree of an unsafe situation).

The danger determining unit 30A may notify a detail of the dangerous situation. For example, the danger determining unit 30A may output a voice message, on the sound output device D2, that informs the detail of a possible situation such as "The edge of the hole may collapse." or may display a text message that informs the detail of the possible situation on the display D1.

Figure 6:
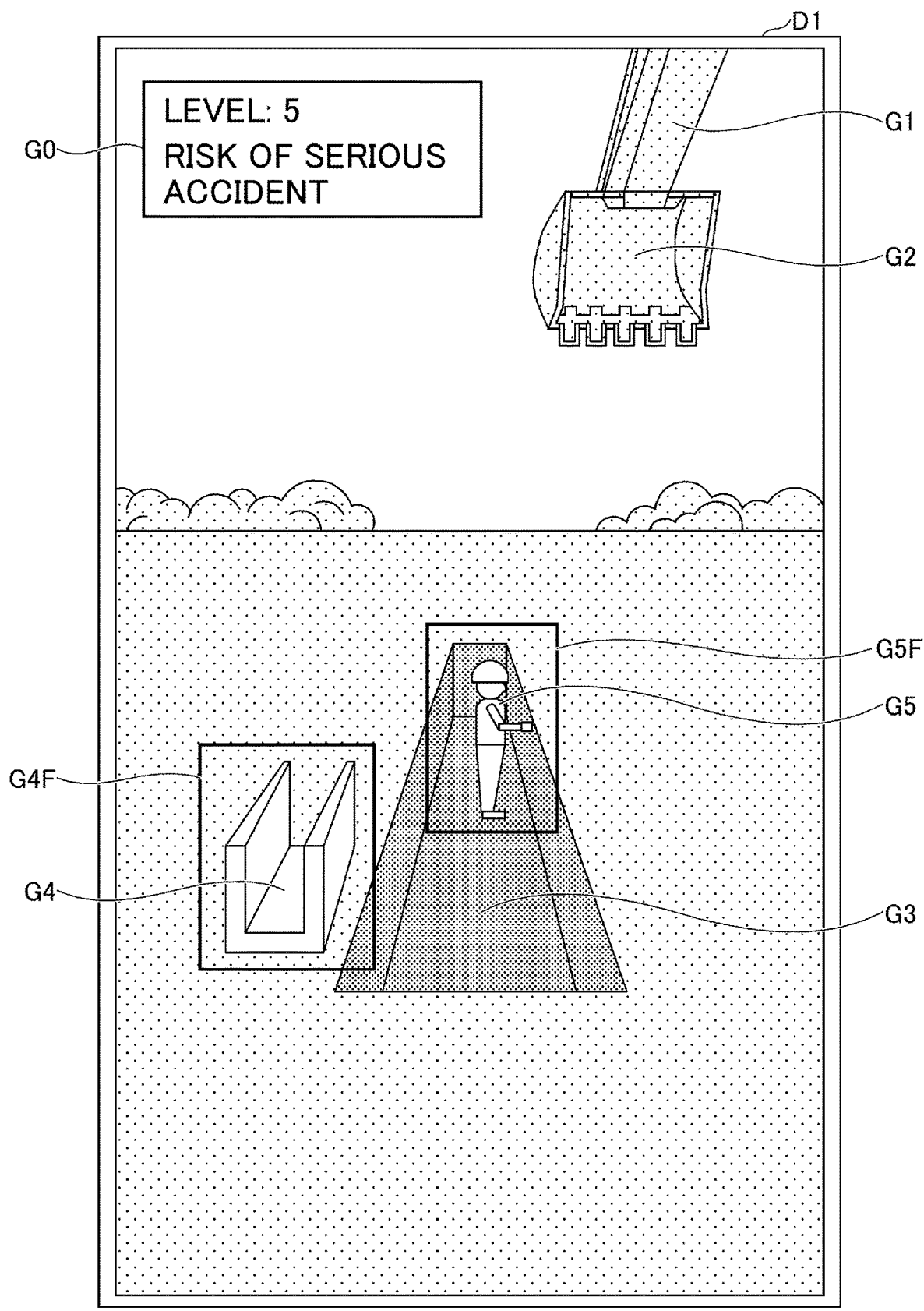
FIG. 6 is a diagram illustrating another display example of the input image.

FIG. 6 illustrates another example of the input image, displayed on the display D1, obtained by the front camera 70F. The displayed input image includes a message window G0, an image G1 of the arm 5, an image G2 of the bucket 6, an image G3 of the hole excavated by shovel 100, an image G4 of the gutter block temporarily placed near the hole, a frame image G4F surrounding the image G4, an image G5 of the worker who entered the hole, and a frame image G5F surrounding the image G5. The message window G0 indicates that the current danger level is level 5 and the cause is "risk of a serious accident."

The danger determining unit 30A recognizes the presence of the gutter block, the hole excavated by the shovel 100, and the worker in the hole by performing image processing on the input image. Then danger determining unit 30A derives the distance between the gutter block and the edge of the hole and the distance between the gutter block and the worker. The danger determining unit 30A determines that the dangerous situation is occurring when the distance between the gutter block and the edge of the hole is determined to be less than a first threshold value stored in the danger information database DB and the distance between the gutter block and the worker is determined to be less than a second threshold value stored in the danger information database DB. At this time, even if the positional relationship is the same, the result of determining whether the dangerous situation will occur may be changed when the size of the gutter block or the size of the hole is different. Therefore, the danger determining unit 30A may change at least one of the first threshold value or the second threshold value based on the size of the gutter block, the size of the hole, and the work environment information.

When the dangerous situation is determined to occur, the danger determining unit 30A operates the notification device in a manner different from when the notification device is operated in the situation illustrated in FIG. 5. This is because the worker is not involved in the dangerous situation in the situation illustrated in FIG. 5, whereas the worker is involved in the dangerous situation in the situation illustrated in FIG. 6. Specifically, the danger determining unit 30A operates the notification device to alert the operator and the operator of the shovel 100 more reliably.

The danger determining unit 30A may be configured to be able to estimate the construction situation existing at a lapse of a predetermined time from current time based on the information obtained by the information obtaining device E1. The danger determining unit 30A may be configured to be able to determine whether the dangerous situation existing at a lapse of a predetermined time from current time based on the estimated construction situation information and the information stored in the danger information database DB.

Figure 7:
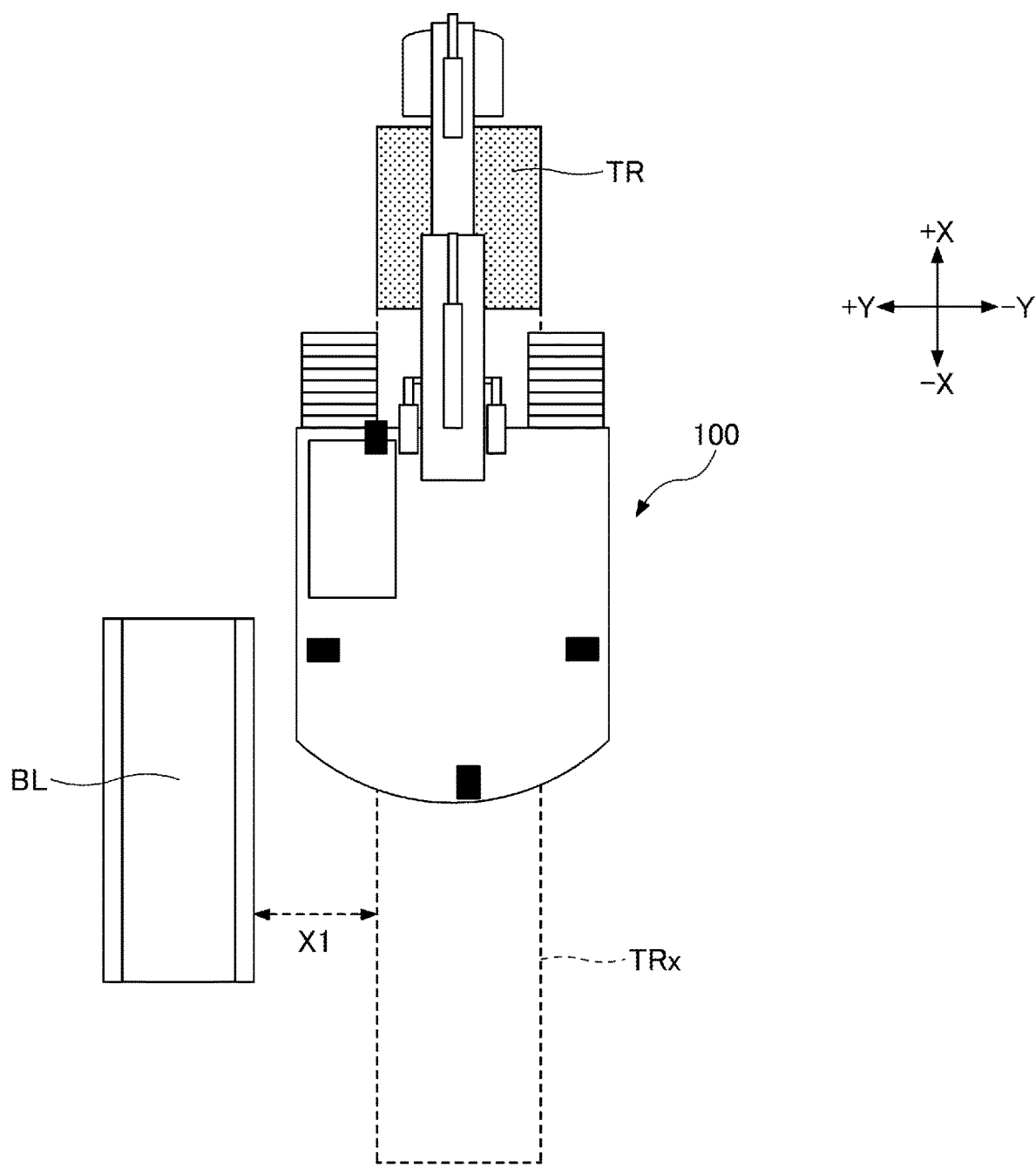
FIG. 7 is a top view of a shovel excavating a hole.

Specifically, as illustrated in FIG. 7, the danger determining unit 30A estimates the shape of a hole TR excavated by the shovel 100 after a lapse of the predetermined time based on the shape of the hole TR. FIG. 7 is a top view of the work site where the shovel 100 is located. The virtual dashed line in FIG. 7 represents the shape of the hole TR, after a lapse of the predetermined time, estimated by the danger determining unit 30A, that is, the shape of the unexcavated hole TRx.

Then, the danger determining unit 30A derives the relative positional relationship between the unexcavated hole TRx and the gutter block BL as input information. The danger determining unit 30A recognizes the location of the gutter block BL based on the input image obtained by the left camera 70L. The danger determining unit 30A collates the derived input information with the reference information corresponding to the input information stored in the danger information database DB. The danger determining unit 30A determines that the dangerous situation may occur at a lapse of a predetermined time from current time, when the situation represented by the input information is determined to be the same or similar to the situation represented by the reference information.

More specifically, the danger determining unit 30A derives the current shape of the hole TR excavated by the shovel 100 based on the information obtained by the information obtaining device E1. The danger determining unit 30A estimates the shape of the hole TRx after a lapse of the predetermined time from the current shape of the hole TR excavated by the shovel 100. Subsequently, the danger determining unit 30A derives a distance X1 and the like, as input information, from the edge of the hole TRx to the gutter block BL after a lapse of the predetermined time. The danger determining unit 30A collates the derived input information with the reference information representing the dangerous situation stored in the danger information database DB. The danger determining unit 30A determines that the dangerous situation may occur at a lapse of a predetermined time from current time, when the situation represented by the input information is determined to be the same or similar to the situation represented by the reference information.

Alternatively, the danger determining unit 30A may be configured to be able to determine whether the dangerous situation will occur in the future before the shovel 100 excavates a hole.

Figure 8:
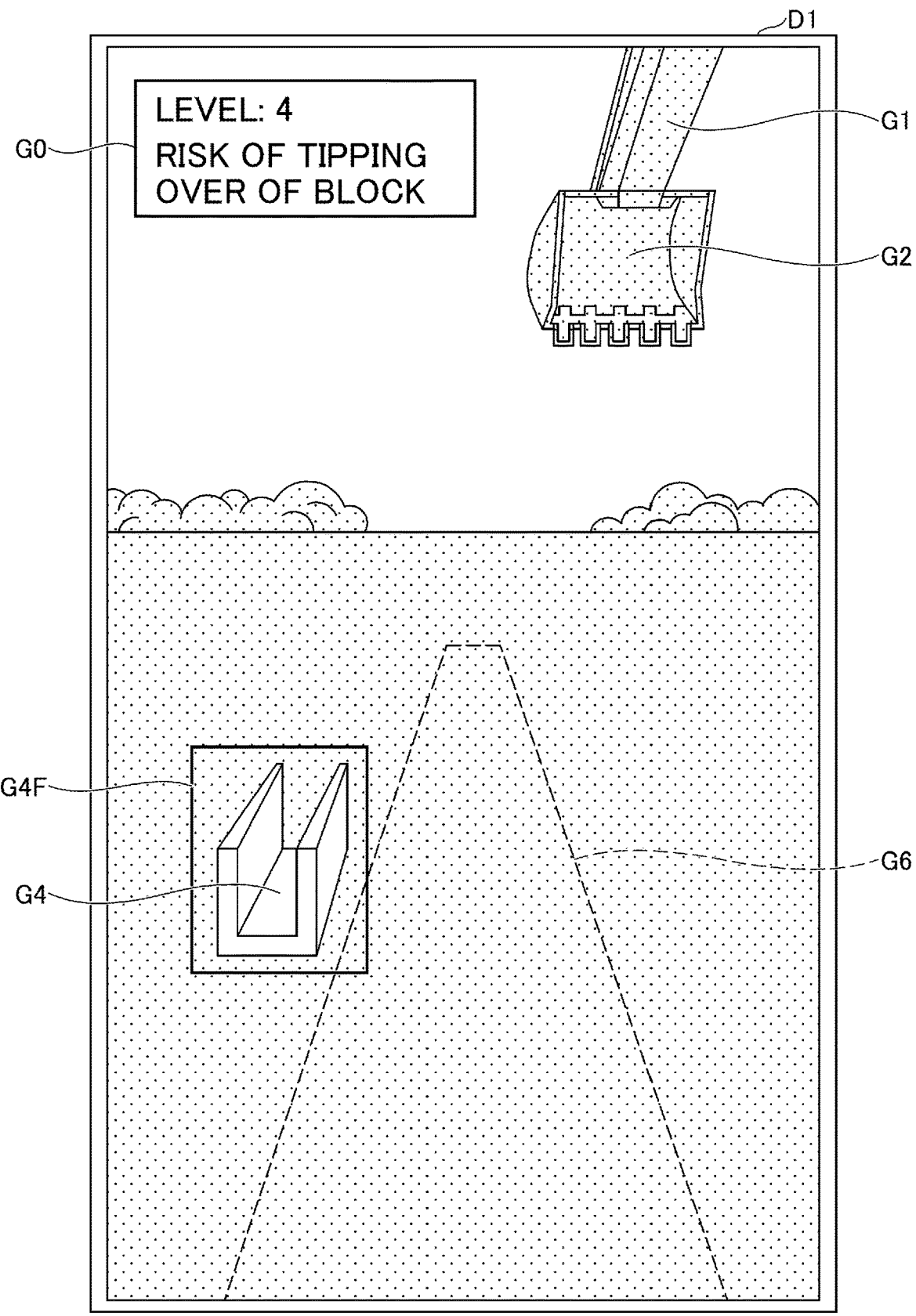
FIG. 8 is a diagram illustrating yet another display example of the input image.

Specifically, the danger determining unit 30A may determine whether the dangerous situation may occur in the future when the gutter block BL is temporarily placed as illustrated in FIG. 8. Alternatively, the danger determining unit 30A may determine that the dangerous situation may occur in the future when the excavation of the hole is started near the temporarily placed gutter block BL as illustrated in FIG. 8.

FIG. 8 illustrates another example of the input image, displayed on the display D1, obtained by the front camera 70F. The displayed input image includes a message window G0, an image G1 of the arm 5, an image G2 of the bucket 6, an image G4 of the gutter block temporarily placed near the hole, a frame image G4F surrounding the image G4, and an image G6 illustrating the shape of the unexcavated hole that is to be excavated by the shovel. The message window G0 indicates that the current danger level is level 4 and the cause is "risk of tipping over of a block."

In the example of FIG. 8, the image G6 is generated based on the information related to the construction plan such as design data stored in advance in the non-volatile storage device NM included in the controller 30. The image G6 may be generated based on data regarding a pose of the excavation attachment at the present time, data regarding an orientation of the upper swing structure 3, and the like.

The danger determining unit 30A recognizes the presence of the gutter block BL by performing image processing on the input image, and derives the distance between the gutter block BL and the edge of the hole to be excavated in the future. The danger determining unit 30A determines that the dangerous situation may occur in the future when the distance between the gutter block BL and the edge of the unexcavated hole is determined to be less than a threshold value stored in the danger information database DB.

Alternatively, the danger determining unit 30A may recognize that the gutter block BL presents at a position other than the area set as the temporary storage place for the gutter block BL by performing image processing on the input image. In this case, the danger determining unit 30A may specify an area set as the temporary storage place for the gutter block BL based on the design data. The danger determining unit 30A may determine that the dangerous situation may occur in the future based on the gutter block BL being temporarily placed at a position other than the area set as the temporary storage place. In such a way, the danger determining unit 30A may determine whether the dangerous situation may occur in the future based on the information related to the arrangement of a material such as the gutter block BL.

Alternatively, the danger determining unit 30A may recognize the presence of the hole excavated by the shovel 100 by performing image processing on the input image, and may derive the distance between the material such as the gutter block BL and the edge of the hole. The danger determining unit 30A may determine that the dangerous situation may occur in the future when the distance between the temporary storage place where the material has not been temporarily stored and the edge of the hole is less than the threshold value stored in the danger information database DB. This is because if the material is temporarily placed in the temporary storage place according to the construction plan after the hole is excavated, the edge of the hole may collapse.

Figure 9:
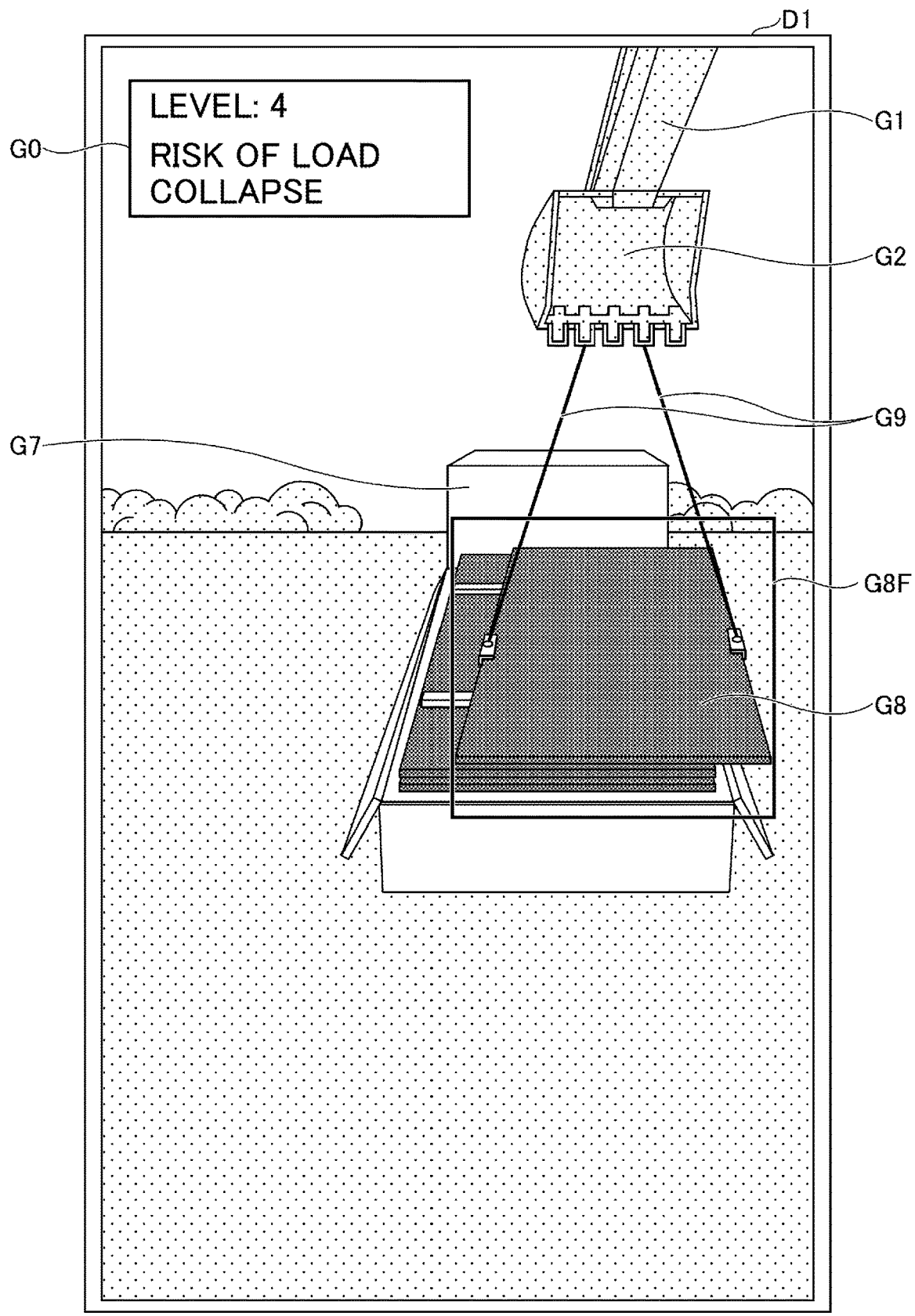
FIG. 9 is a diagram illustrating yet another display example of the input image.

The danger determining unit 30A may determine that the dangerous situation will occur when the positional relationship illustrated in FIG. 9 is recognized based on the input image obtained by the front camera 70F. The front camera 70F is an example of the information obtaining device E1.

FIG. 9 illustrates yet another example of the input image, displayed on the display D1, obtained by the front camera 70F. The displayed input image includes a message window G0, an image G1 of the arm 5, an image G2 of the bucket 6, an image G7 of a dump truck, an image G8 of iron plates loaded on a loading platform of the dump truck, a frame image G8F surrounding the image G8, and an image G9 of a crane wire (wire rope) for lifting the iron plate as a suspended load. The message window G0 indicates that the current danger level is level 5 and the cause is "risk of load collapse."

The danger determining unit 30A recognizes the presence of the dump truck loaded with the iron plates and the presence of the iron plate lifted by the shovel 100 operating in crane mode by performing image processing on the input image, and derives a shape of the iron plate to be lifted, the number and location of lifting points, a horizontal distance between a center of the iron plate and a center of the lifting points, and the like. The danger determining unit 30A determines that the dangerous situation is occurring, for example, when the relationship between the shape of the iron plate to be lifted and the number and location of the lifting points is determined to be matched or similar to the relationship stored in the information database DB. Alternatively, the danger determining unit 30A may determine that the dangerous situation is occurring when the horizontal distance between the center of the iron plate and the center of the lifting point is determined to be equal to or greater than a threshold value stored in the danger information database DB.

When the dangerous situation is determined to occur, the danger determining unit 30A activates the notification device to notify the outside of the risk that the dangerous situation may occur. In the present embodiment, the danger determining unit 30A operates the display D1 and the indoor alarm device to notify the operator of the shovel 100 of the risk that the dangerous situation may occur. Further, the danger determining unit 30A may activate the outdoor alarm device to notify the operator working around the shovel 100 of the risk that the dangerous situation may occur.

The danger determining unit 30A may notify a detail of the dangerous situation that may occur. For example, the danger determining unit 30A may output a voice message and a text message that inform the detail of a possible situation such as "The lifted load may collapse."

In the embodiment described above, the danger determining unit 30A is implemented as a functional element of the controller 30 installed in the shovel 100, but may be installed outside the shovel 100. In this case, if the iron plate is predicted to be tilted due to the improper position of the lifting point, the danger determining unit 30A may increase the danger level when the worker enters a place where the iron plate is predicted to be tilted.

Figure 10:
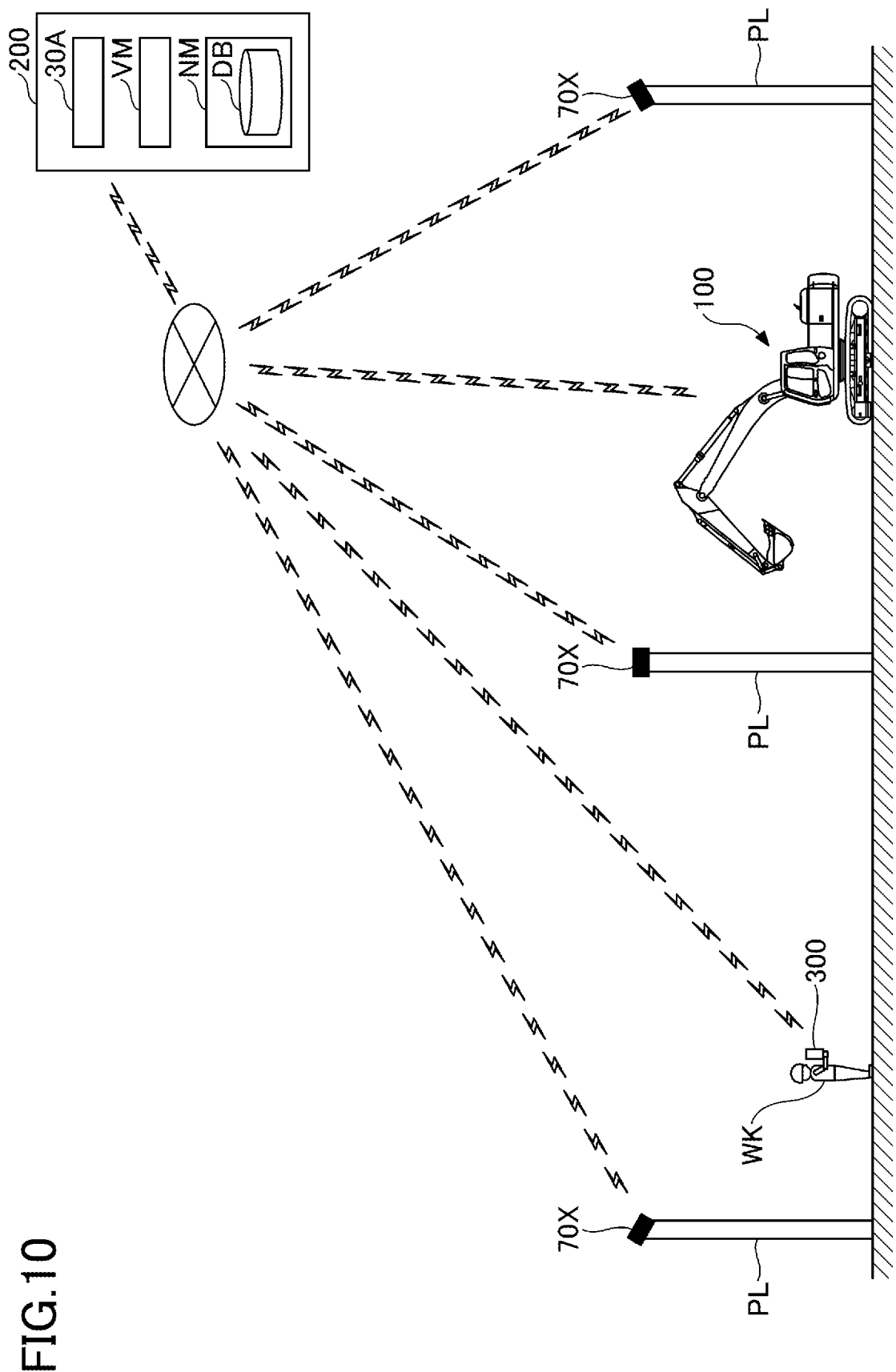
FIG. 10 is a diagram illustrating a configuration example of a shovel assist system.

Specifically, as illustrated in FIG. 10, the danger determining unit 30A may be implemented as a functional element of the management device 200 installed in the management center or the like outside the shovel 100. FIG. 10 is a diagram illustrating a configuration example of a shovel assist system. The shovel assist system mainly includes one or more shovels 100, one or more management devices 200, one or more assist devices 300, and one or more fixed point cameras 70X. The shovel assist system of FIG. 10 is constituted of one shovel 100, one management device 200, one assist device 300, and three fixed point cameras 70X. The assist device 300 is a mobile terminal such as a smartphone or tablet PC carried by a worker WK.

Each of the shovel 100, the management device 200, the assist device 300, and the fixed point camera 70X is communicably connected to each other via at least one of a mobile phone communication network, a satellite communication network, a wireless LAN communication network, or the like.

Each of the three fixed point cameras 70X is attached to a structure PL such as a pole or a steel tower installed at the work site and is arranged apart from each other so that the entire area of the work site can be included in the imaging range.

In the example of FIG. 10, the danger determining unit 30A is configured to be able to determine whether the dangerous situation will occur based on the information obtained by the information obtaining device E1 attached to the shovel 100, the structure PL, or the like, and the information stored in the danger information database DB. The information obtaining device E1 includes a fixed point camera 70X. The danger information database DB is stored in the non-volatile storage device NM included in the management device 200.

Specifically, for example, the danger determining unit 30A determines that the dangerous situation may occur when the positional relationship as illustrated in FIG. 5 to FIG. 8 is recognized based on the input image obtained by the fixed point camera 70X. The fixed point camera 70X is an example of the information obtaining device E1.

The danger determining unit 30A and the danger information database DB may be installed in the assist device 300. Alternatively, the danger determining unit 30A and the danger information database DB may be separately installed in two of the shovel 100, the management device 200, and the assist device 300.

The danger determining unit 30A may be configured to be able to determine whether the dangerous situation may occur at a construction planning stage. In this case, the danger determining unit 30A is typically installed in the management device 200 or the assist device 300 to constitute a construction system that assists the preparation of a construction plan.

Figure 11:
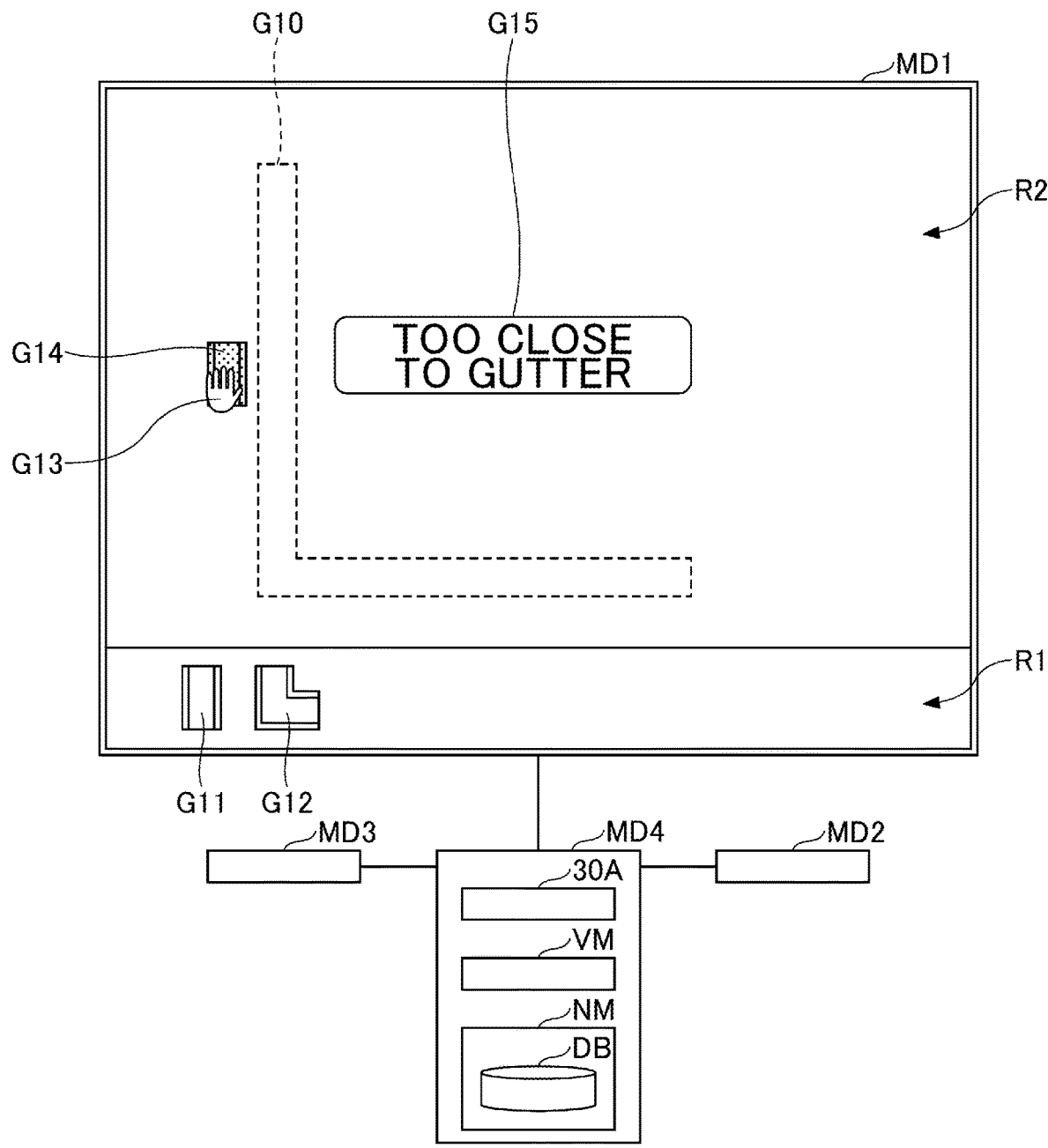
FIG. 11 is a diagram illustrating a configuration example of a construction system.

FIG. 11 is a diagram illustrating a configuration example of the construction system. The construction system is, for example, a computer system installed in a management center or the like, and mainly includes a display MD1, a sound output device MD2, an information input device MD3, and a controller MD4.

The display MD1 is an example of a notification device, and is configured to be able to display various types of information. In the example of FIG. 11, the display MD1 is a liquid crystal display installed in the management center.

The sound output device MD2 is another example of the notification device, and is configured to be able to output sound. In the example of FIG. 11, the sound output device MD2 is a speaker that outputs sound to an administrator who uses the construction system.

The information input device MD3 is configured so that the administrator who prepares the construction plan can input information to the controller MD4. In the example of FIG. 11, the information input device MD3 is a touch panel arranged on an image display portion of the display MD1. The information input device MD3 may be a digitizer, a stylus, a mouse, a trackball, or the like.

The controller MD4 is a control device to control the construction system. In the example of FIG. 11, the controller MD4 is constituted of a computer including components such as the CPU, the volatile storage device VM, the non-volatile storage device NM. Then, the controller MD4 reads the program corresponding to each function from the non-volatile storage device NM, loads it into the volatile storage device VM, and causes the CPU to execute the corresponding processing. The danger determining unit 30A is implemented as a functional element of the controller MD4.

The image display portion of the display MD1 of FIG. 11 displays an image to be displayed when the administrator prepares the construction plan for burying the gutter block. Specifically, the image to be displayed includes an image G10 representing the area where the hole for burying the gutter block is excavated, an image G11 representing the normal gutter block, an image G12 representing the gutter block for a corner, an image G13 representing a cursor, an image G14 representing a selected (drag operation) gutter block, and an image G15 representing a pop-up window including a text message.

The administrator can determine, for example, the range in which the hole for burying the gutter block is formed by arranging the image G10 at a desired position in a desired size and a desired shape. The range represented by the image G10 represents the range excavated by the shovel 100. The administrator can determine the shape and size of the image G10 by designating a desired range in the image display portion using, for example, a digitizer or the like.

Further, the administrator can determine the temporary placement position of the normal gutter block by moving the image G11 displayed in the material display area R1 or a duplicate of the image G11 to a desired position in the work site display area R2 with a drag and drop operation of the image G11. The same applies to the gutter block for a corner. The material display area is an area for displaying an image illustrating each type of multiple materials whose temporary placement position is determined by the construction system so that the manager can select them. The work site display area R2 is an area for displaying a top view of the work site.

FIG. 11 illustrates a state in which, after the area where the gutter block is buried is set as illustrated in the image G10, a duplicate of the image G11 is moved in proximity to the image G10 by a drag operation and placed in proximity to the image G10 by a drop operation. The administrator may prepare a construction plan (material temporary placement plan) so that the gutter block is temporarily placed at the desired position before the hole is actually excavated by the shovel 100. The administrator may prepare a construction plan (material temporary placement plan) so that the gutter block is temporarily placed at the desired position after the hole is actually excavated by the shovel 100.

The danger determining unit 30A derives the distance from the edge of the hole to be excavated to the gutter block temporarily placed as input information based on the information obtained by the information input device MD3 as the information obtaining device E1.

The information obtained by the information input device MD3 includes, for example, information regarding the location of the hole to be excavated represented by the image G10, information regarding the location of the temporarily placed gutter block represented by the image G14, and the like. The information regarding the location of the hole to be excavated is an example of schedule information after a predetermined time.

The danger determining unit 30A collates the derived input information with the reference information representing the dangerous situation stored in the danger information database DB. The danger determining unit 30A determines that the dangerous situation may occur in the future, when the situation represented by the input information is determined to be the same or similar to the situation represented by the reference information.

When the dangerous situation is determined to occur in the future, the danger determining unit 30A activates the notification device to notify the administrator of the risk that the dangerous situation may occur. In the example of FIG. 11, the danger determining unit 30A displays the image G15 including a warning message "too close to the gutter" on the image display portion of the display MD1 to bring this to the attention of the administrator. This is because if the work is performed according to such a construction plan, the edge of the hole may collapse due to the weight of the gutter block. The danger determining unit 30A may output a voice message from the sound output device MD2 to bring this to the attention of the administrator.

According to this configuration, the construction system is capable of preventing the administrator from preparing a construction plan that may cause the dangerous situation in the future.

The danger determining unit 30A is configured to recognize an input scene represented by the presence/absence of multiple specific objects, and then determine, without quantitatively deriving a relative positional relationship between multiple specific objects such as a hole and a gutter block excavated by the shovel 100, whether the recognized input scene represents the dangerous situation.

The input scene includes, for example, a scene in which only the hole excavated by the shovel 100 presents, a scene in which the hole and the gutter block excavated by the shovel 100 present, or a scene in which the hole and the gutter block excavated by the shovel 100, and the worker present.

Figure 12:
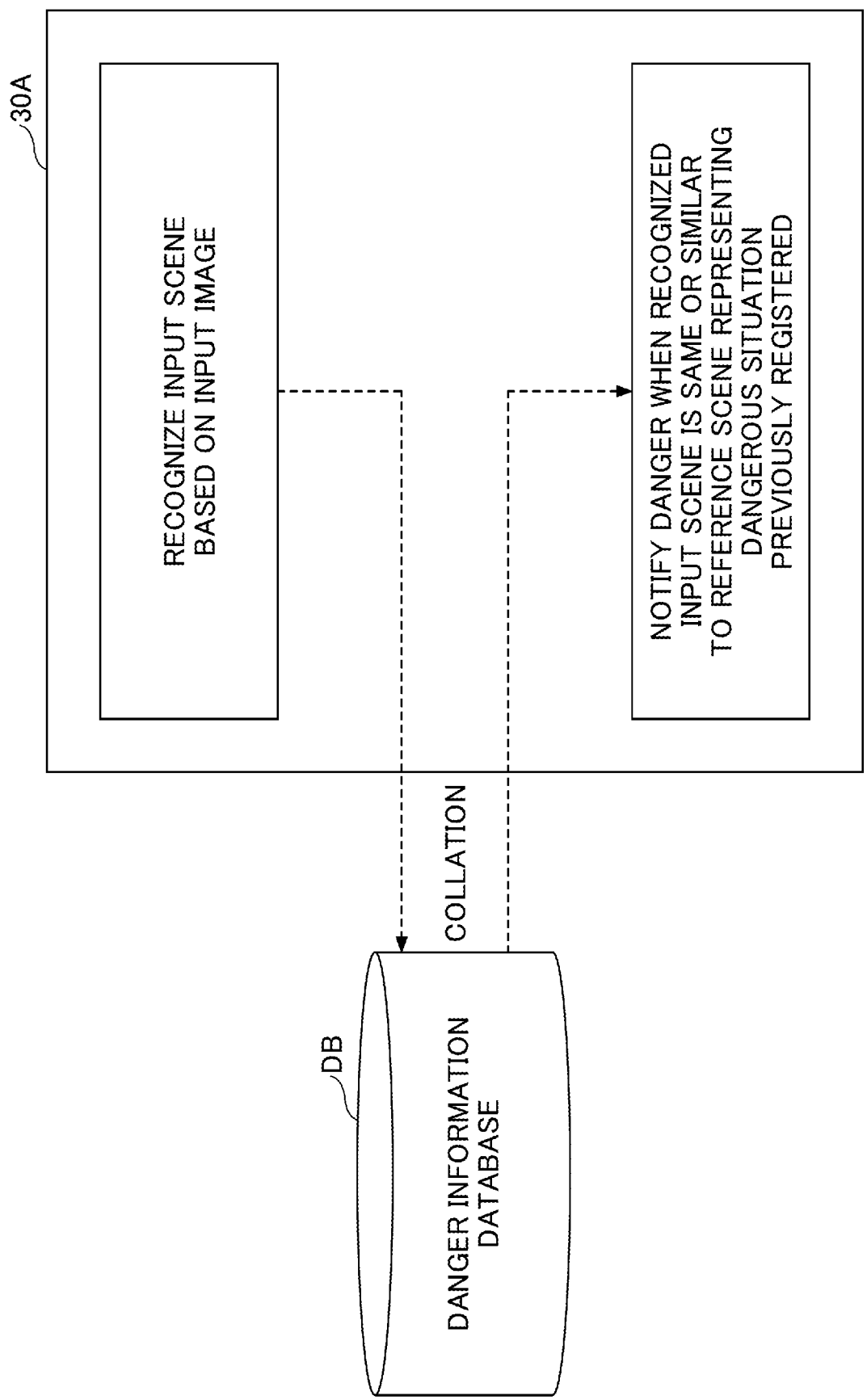
FIG. 12 is a conceptual diagram illustrating another example of a relationship between a danger determining unit and danger information database.

FIG. 12 is a conceptual diagram illustrating another example of a relationship between the danger determining unit 30A and the danger information database DB. In the example of FIG. 12, the danger determining unit 30A collates the recognized input scene with a reference scene representing the dangerous situation stored in the danger information database DB. The danger determining unit 30A determines that the dangerous situation will occur when the input scene is determined to be matched or similar to the reference scene.

The reference scene representing the dangerous situation is, for example, information generated based on stored past accident cases including, for example, information based on an image of the work site immediately before the accident occurs.

Specifically, the danger determining unit 30A recognizes the input scene by specifying one or more objects using a neural network without deriving a numerical value such as the depth of the hole excavated by the shovel 100, the volume of the gutter block, and the distance from the edge of the hole to the gutter block. Then, the danger determining unit 30A uses the neural network to determine whether the recognized input scene is the reference scene representing the dangerous situation. The danger determining unit 30A may determine whether the input scene matches or is similar to multiple reference scenes having different danger levels by using an image classification technique using the neural network.

Figure 13:
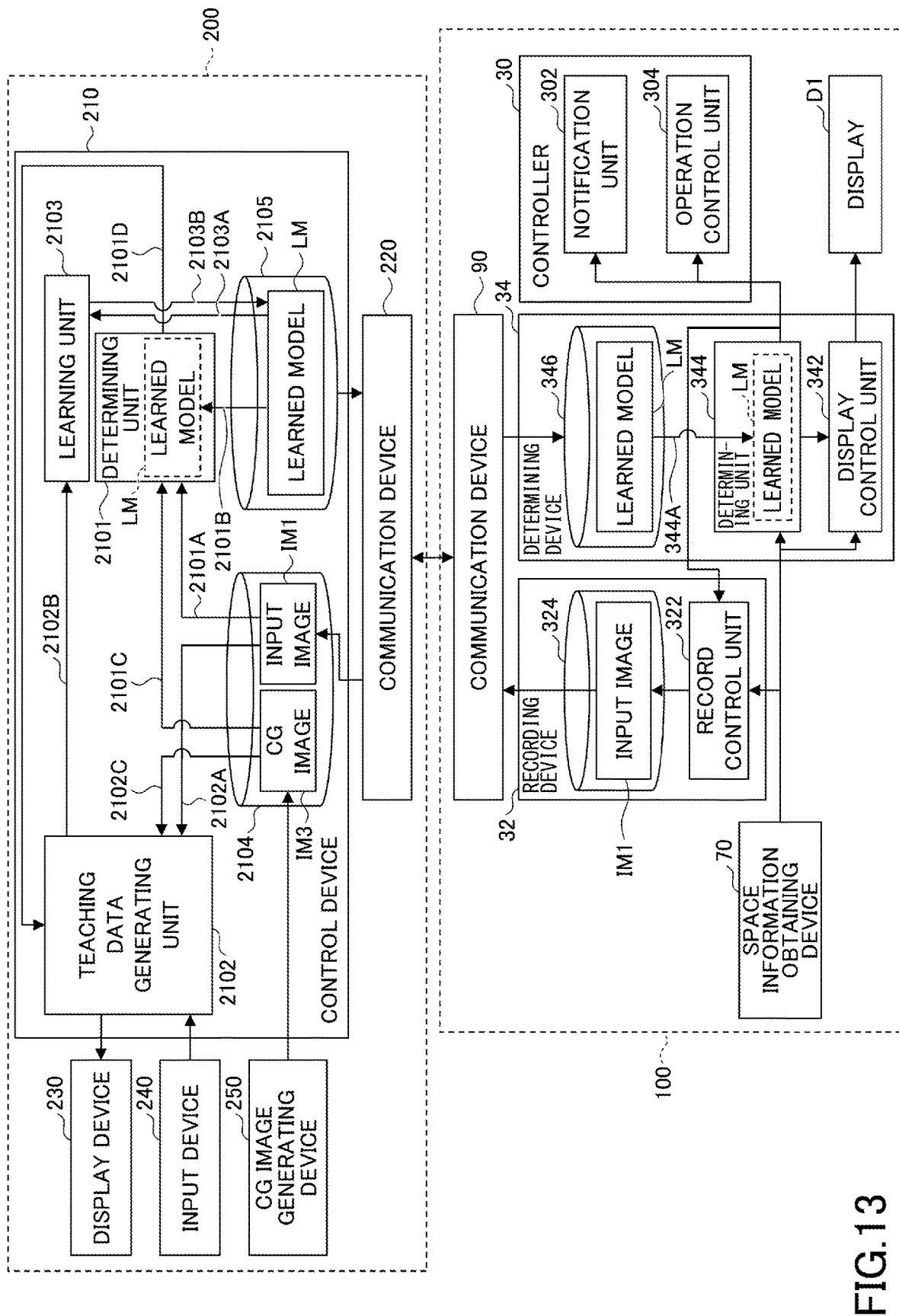
FIG. 13 is a diagram illustrating a configuration example of a shovel assist system.

Herein, the shovel assist system using the neural network will be described with reference to FIG. 13 to FIG. 15. FIG. 13 is a diagram illustrating a configuration example of the shovel assist system. In the example of FIG. 13, the shovel 100 includes a controller 30, a recording device 32, and a determining device 34.

The controller 30 determines, with the determining device 34, a type of a monitoring target object (for example, a person, a truck, another construction machine, a utility pole, lifting load, a pylon, a building, and the like), when the monitoring target object is detected within a predetermined monitoring area around the shovel 100 (for example, a working area within five meters of the shovel 100). The controller 30 performs control for avoiding contact between the object and the shovel 100 according to the type of the object (hereinafter, referred to as a "contact avoidance control"). The controller 30 includes a notification unit 302 and an operation control unit 304 as functional units related to contact avoidance control implemented by executing one or more programs on the CPU. The one or more programs are stored in the ROM, the auxiliary storage device, or the like.

Further, the avoidance control may be omitted depending on the type of the object, even if the object presents in the monitoring area of the shovel 100. For example, in a crane mode, even if a wire rope presents near the back surface of the bucket 6, the avoidance control is not executed for the wire rope because the wire rope is a part of a work tool. In such a way, an execution of the avoidance control is determined according to the position and the location of the object.

Further, even if the controller 30 detects a temporarily placed soil and sand mountain, which is expected to be loaded, the avoidance control is not executed for the soil and sand mountain, and excavation operation is permitted. However, in driving work, the avoidance control is executed for the soil and sand mountain because the shovel driving on the soil and sand mountain is unstable. In such a way, the execution of the avoidance control (avoidance operation) may be determined according to the position, location, work content, and the like of the object. Further, not only the execution of avoidance control but also the detail of the operation may be determined according to the position, location, work content, and the like of the object.

The recording device 32 records an image (input image) obtained by the camera as the space recognition device 70 at a predetermined timing. The recording device 32 may be implemented by any hardware or a combination of any hardware and software. For example, the recording device 32 may be configured mainly on a computer similar to the controller 30. The recording device 32 includes, for example, a record control unit 322 as a functional unit implemented by executing one or more programs on the CPU. The one or more programs are stored in the ROM or the auxiliary storage device. Further, the recording device 32 includes a storage unit 324 as a storage area specified in the internal memory.

The determining device 34 performs a determination regarding the object around the shovel 100 (for example, an object detection determination, an object classification determination, and the like) based on the input image. The determining device 34 may be implemented by any hardware or a combination of any hardware and software. For example, the determining device 34 may be configured, in addition to the same configuration as the controller 30 (that is, the CPU, the RAM, the ROM, the auxiliary storage device, the various input/output interfaces, and the like.), mainly on a computer including a calculation device for image processing. The calculation device performs high-speed calculation by parallel processing in conjunction with processing by the CPU. Hereinafter, a control device 210 of the management device 200, which will be described below, has the same configuration. The calculation device for image processing may include a Graphics Processing Unit (GPU), a Field Programmable Gate Array (FPGA), and an Application Specific Integrated Circuit (ASIC). The determining device 34 includes a display control unit 342 and a determining unit 344 as functional units implemented by executing one or more programs on the CPU. The one or more programs are stored in the ROM, the auxiliary storage device, or the like. Further, the determining device 34 includes a storage unit 346 as a storage area specified in the non-volatile internal memory. Note that a part or all of the controller 30, the recording device 32, and the determining device 34 may be integrated into one device.

The display D1 displays an image illustrating the surrounding state of the shovel 100 based on the input image under the control of the determining device 34 (i.e., the display control unit 342). Specifically, the display D1 displays the input image. Further, the display D1 displays a converted image to which a predetermined conversion processing (for example, viewpoint conversion processing) or the like is applied to the input image. The converted image is generated by the determining device 34. The converted image may be, for example, a viewpoint converted image in which an overhead image having a view from directly above the shovel 100 is combined with a horizontal image having a view of a long distance from the shovel 100 in a horizontal direction. Further, the viewpoint converted image may be a combined image in which images individually obtained by the front camera 70F, the back camera 70B, the left camera 70L, and the right camera 70R are converted into viewpoint converted images generated from overhead images and horizontal images, and the viewpoint converted images are combined.

A communication device 90 is any device that connects to the communication network and performs communication with the external device such as the management device 200. The communication device 90 may be, for example, a mobile communication module corresponding to a predetermined mobile communication standard such as Long Term Evolution (LTE), 4th Generation (4G), or 5th Generation (5G).

If a monitoring target object is detected by the determining device 34 (i.e., the determining unit 344) in the monitoring area around the shovel 100, the notification unit 302 notifies the operator or the like that the monitoring target object is detected. This enables the operator or the like to recognize an entry even when the object is positioned in a blind area when viewed from the cabin 10, and to perform an operation to secure safety such as canceling operation to the operating device 26 when a monitoring target object enters a relatively close area around the shovel 100.

For example, the notification unit 302 notifies the operator or the like that the monitoring target object has been detected in the monitoring area in proximity to the shovel 100 by outputting a control signal to the sound output device D2. The determining device 34 may notify that the monitoring target object has been detected in the monitoring area around the shovel 100 through the display D1.

The operation control unit 304 restricts the operation of the shovel 100 if a monitoring target object is detected within a monitoring area around the shovel 100 by the determining device 34 (i.e., the determining unit 344). As a result, when a monitoring target object enters a monitoring area in proximity to the shovel 100, the operation control unit 304 can restrict the operation of the shovel 100 and reduce the possibility of contact between the shovel 100 and the monitoring target object. At this time, restrictions on the operation of the shovel 100 may include delaying the operations of various operating elements of the shovel 100 that are outputs with respect to an operation content (i.e., an operation amount) of an operator or the like in the operating device 26. Further, restrictions on the operation of the shovel 100 may include stopping the operation of the operating elements of the shovel 100 regardless of the operation content of the operating device 26. The operating elements of the shovel 100 to which restrictions on the operation of the shovel 100 are applied may be all of the operating elements that can be operated by the operating device 26, or may be some of the operating elements necessary to avoid contact between the shovel 100 and the monitoring target object.

The operation control unit 304 may, for example, output a control signal to a pressure reduction valve provided on a secondary pilot line of the operating device 26 of a hydraulic pilot type to depressurize a pilot pressure corresponding to the operation content performed by an operator or the like on the operating device 26. The operation control unit 304 may output a control signal, limiting an operation amount smaller than the operation content (i.e., the operation amount) corresponding to the operation signal input from the operating device 26 of an electric type, to the solenoid valve (i.e., an operation control valve) to control the solenoid valve and to reduce the pilot pressure acting on the control valve from the solenoid valve. Alternatively, the operation control unit 304 may output a control signal, limiting an operation amount smaller than the content (i.e., the operation amount) of the remote operation, specified by the remote operation signal, to the operation control valve, to reduce the pilot pressure acting on the control valve from the operation control valve. This can reduce the pilot pressure, corresponding to the content of the operation performed on the operating device 26 or the remote operation, acting on the control valve that controls the hydraulic oil supplied to the hydraulic actuator and restrict the operations of various operating elements (i.e., the driven elements).

The record control unit 322 (i.e., an example of the recording unit) records the image obtained by the camera (i.e., the front camera 70F, the back camera 70B, the left camera 70L, and the right camera 70R) in the storage unit 324 at a predetermined timing (hereinafter, referred to as a "recording timing"). As a result, although the capacity of the storage unit 324 is limited, the images captured by the camera can be recorded to the storage unit 324 at a predetermined necessary timing. Further, as described later, the transmission capacity is reduced when the input image of the storage unit 324 is transmitted to the management device 200, thereby reducing the communication cost. Specifically, for example, when a recording timing is reached, the record control unit 322 obtains an input image corresponding to the recording timing among input images including past images in a ring buffer specified in the RAM or the like, and stores the input image to the storage unit 324.

The recording timing may be, for example, a predetermined periodic timing. The recording timing may be a time of occurrence of a state of the shovel 100, in which incorrect determination likely occurs when an object around the shovel 100 is determined by the determining device 34 (the determining unit 344) based on the input image. Specifically, the recording timing may be when the shovel 100 travels and when the shovel 100 turns. Further, the recording timing may be when the determining unit 344 determines that an object is detected in the monitoring area around the shovel 100. Further, the recording start timing may be started by turning on the controller, by releasing the gate lock lever, or by turning on the operation lever.

In FIG. 13, a result determined by the determining unit 344 is input to the recording device 32 (i.e., the record control unit 322). However, if the recording timing is defined regardless of the result determined by the determining unit 344, the result determined by the determining unit 344 is not required to be input to the recording device 32.

An input image IM1 is recorded in the storage unit 324 under the control of the record control unit 322 from when an initial process performed after starting the shovel 100 is completed to when the shovel 100 stops. One or more input images IM1 recorded in the storage unit 324 are transmitted to the management device 200 through the communication device 90 (an example of the environmental information transmission unit) at a predetermined timing (hereinafter, referred to as an "image transmission timing").

The image transmission timing may be, for example, when an operation of stopping the shovel 100 is performed. The transmission timing may be when the free capacity of the storage unit 324 is below a predetermined threshold value. This is because the total capacity of the input images IM1 recorded in the storage unit 324 may be relatively large during the period from the start to the stop of the shovel 100. Further, the image transmission timing may be, for example, when the initial process performed after starting the shovel 100 is completed. In this case, the storage unit 324 is a storage area defined in non-volatile internal memory, and a configuration, in which the input images IM1 recorded during the period from the previous start and stop of the shovel 100 are transmitted to the management device 200, may be used.

A configuration in which the input images IM1 are sequentially transmitted to the management device 200 through the communication device 90 every time the input image IM1 is recorded in the storage unit 324 may be used.

The display control unit 342 displays an image representing the surroundings of the shovel 100 (hereinafter, referred to as a "shovel surroundings image") on the display D1.

For example, the display control unit 342 displays the input image as the shovel surroundings image on the display D1. Specifically, the display control unit 342 may display the input image of a part of the cameras selected from the front camera 70F, the back camera 70B, the left camera 70L, and the right camera 70R on the display D1. At this time, a configuration, in which the display control unit 342 switches a camera corresponding to the input image to be displayed on the display D1 in response to a predetermined operation performed by the operator or the like, may be used. Further, the display control unit 342 may display all input images of the front camera 70F, the back camera 70B, the left camera 70L, and the right camera 70R on the display D1.

Further, for example, the display control unit 342 generates a converted image in which a predetermined converting process is performed on the input image as the shovel surroundings image and displays the generated converted image on the display D1. The converted image may be, for example, a viewpoint converted image in which an overhead image having a view from directly above the shovel 100 is combined with a horizontal image having a view of a long distance from the shovel 100 in a horizontal direction. Further, the viewpoint converted image may be a combined image (hereinafter, a "viewpoint converted combined image") in which images respectively captured by the front camera 70F, the back camera 70B, the left camera 70L, and the right camera 70R are converted into viewpoint converted images generated from overhead images and horizontal images, and the viewpoint converted images are combined in a predetermined manner.

If a monitoring target object is detected in a predetermined monitoring area around the shovel 100 by the determining unit 344, the display control unit 342 superimposes an image that highlights an area corresponding to the detected object on the shovel surroundings image (hereinafter, referred to as a "detected object area") to display the shovel surroundings image. This enables an operator or the like to easily check the detected object on the shovel surroundings image.

The determining unit 344 performs a determination related to an object around the shovel 100 based on the input image by using a learned model LM on which machine learning is performed, stored in the storage unit 346. Specifically, the determining unit 344 loads the learned model LM from the storage unit 346 into the main storage device such as the RAM (i.e., a path 344A) and causes the CPU to perform the determination related to an object around the shovel 100 based on the input image. For example, as described above, the determining unit 344 detects a monitoring target object while determining whether there is the monitoring target object within a monitoring area around the shovel 100. For example, the determining unit 344 determines (identifies) a type of the detected monitoring target object, that is, classifies the detected monitoring target object in a predetermined list of classifications of the monitoring target object (hereinafter, referred to as a "monitoring target list"). The monitoring target list may include a person, a truck, another construction machine, a utility pole, a lifting load, a pylon, a building, and the like.

Figure 14:
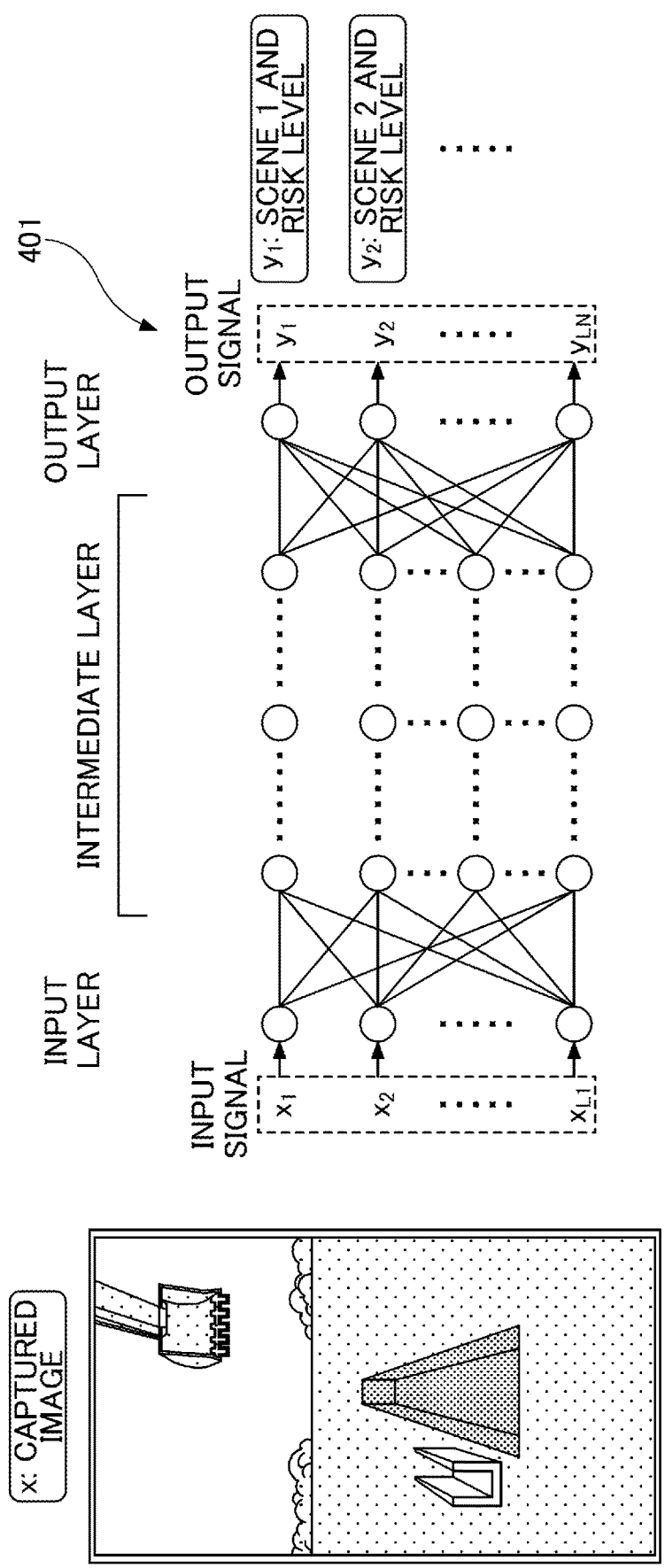
FIG. 14 is a conceptual diagram illustrating an example of determination processing by the determining unit.
Figure 15:
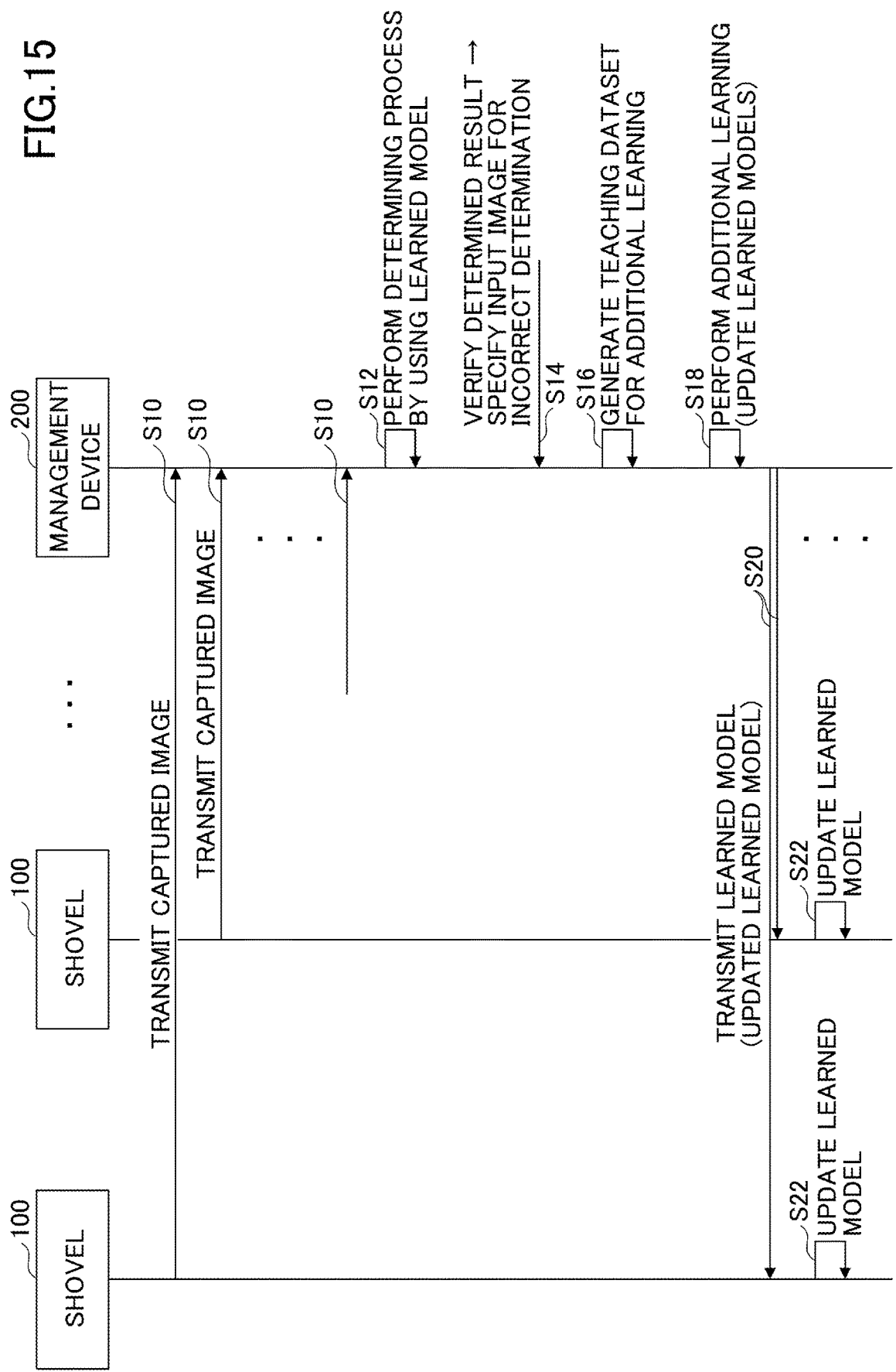
FIG. 15 is a sequence diagram illustrating an example of an operation of the shovel assist system.

For example, as illustrated in FIG. 14, the learned model LM is mainly configured by a Neural Network 401.

In the present example, the neural network 401 is what is called a deep neural network including one or more intermediate layers (i.e., one hidden layer) between an input layer and an output layer. The neural network 401 defines a weight parameter representing the strength of the connection to a lower layer for each of multiple neurons constituting each of the intermediate layers. The neural network 401 is configured such that each neuron of each layer is configured to output a sum of values, which are values input from multiple neurons of an upper layer multiplied by weight parameters defined for the respective neurons of the upper layer, to a neuron of the lower layer through a threshold function.

On the neural network 401, machine learning, that is, specifically deep learning is performed by the management device 200 (i.e., a learning unit 2103), as described below, to optimize weight parameters described above. This enables, for example, as illustrated in FIG. 14, the neural network 401 to receive an input of the input image as an input signal x and to output, as an output signal y, a probability (i.e., predictive probability) that an object is present for each type of objects corresponding to the predetermined monitoring target list (in the present example, "Scene 1 and its risk (for example, a scene (situation) of excavating in the proximity of a block)", "Scene 2 and its risk (for example, a scene (situation) in which a person enters a hole while in the proximity of a block being excavated)", . . . ), a scene based on their positional relationship (situation), and a danger level at that time. The neural network 401 is, for example, a convolutional neural network (CNN). The CNN is a neural network to which existing image processing techniques (convolution processing and pooling processing) have been applied. Specifically, the CNN repeats a combination of the convolution process and the pooling process performed on the input image to retrieve feature data (i.e., a feature map) having a smaller size than the input image. Then, a pixel value of each pixel of the retrieved feature map is input to a neural network including multiple fully connected layers, and the output layer of the neural network can output, for example, predictive probability that an object (including terrain shape, etc.) is present for each type of the objects. The neural network 401 can output the predictive probability of the scene assumed based on the positional relationship for each type of object and the change in the positional relationship. After that, the neural network 401 can output a scene having a high predictive probability and the danger level of the scene.

In this way, the neural network 401 may be configured to receive an input of an input image as the input signal x, and output the position and size of the object in the input image (that is, an area occupied by the object on the input image) and the type of the object as the output signal y. That is, the neural network 401 may be configured to detect an object on the input image (i.e., determine an area occupied by the object on the input image) and to determine the classification of the object. In this case, the output signal y may be configured in an image data format in which information related to the area occupied by the object and the classification of the object is added to the input image that is input as the input signal x in a superimposed manner. This enables the determining unit 344 to determine a relative position (i.e., a distance and a direction) of the object from the shovel 100 based on the position and size of the area occupied by the object on the input image, output from the learned model LM (i.e., the neural network 401). Then, the determining unit 344 can identify the scene in which the object presents. The scene may be identified based on changes in the position and size of the object. This is because the camera (i.e., the front camera 70F, the back camera 70B, the left camera 70L, and the right camera 70R) is fixed to the upper swing structure 3 and an imaging range (i.e., an image angle) is predetermined (or fixed). Then, if the position of the object detected by the learned model LM is within the monitoring area and is classified into the object of the monitoring target list, the determining unit 344 can determine that the monitoring target object is detected in the monitoring area. For example, the neural network 401 may be configured to include a neural network corresponding to each of a process of extracting an occupied area (i.e., a window) where the object in the input image is present and a process of identifying a type of the object in the extracted area. That is, the neural network 401 may be configured to perform the detection of the object and the classification of the object in stages. Further, for example, the neural network 401 may be configured to include a neural network corresponding to each of a process of defining a classification of the object and an occupied area of the object (i.e., a bounding box) for each grid cell obtained by dividing the entire area of the input image into a predetermined number of partial areas, and a process of combining the occupied area of the object for each type based on the classification of the object for each grid cell, and determining a final occupied area of the object. That is, the neural network 401 may be configured to perform the detection of the object and the classification of the object in parallel.

The result determined by the determining unit 344 is, for example, displayed on the display D1 through the display control unit 342.

For example, as illustrated in FIG. 5, a main screen 41V is displayed on the display D1, and the input image is displayed in a camera image display area on the main screen 41V. In the present example, the input image of the back camera 70B is displayed in the camera image display area, and the gutter block installed in front of the shovel 100 and the already excavated gutter are illustrated in the input image.

As described above, by inputting the image data of the input image of the back camera 70B into the learned model LM (i.e., the neural network 401), the determining unit 344 can obtain areas occupied by objects in the input image and identifies types and positional relationship of the objects occupying the areas that are output from the learned model LM. Then, the type of the scene can be derived based on the identified type of the object and the positional relationship. Further, the danger level is calculated based on the derived type of scene. Thus, in the present example, a box icon 501 having a shape enclosing an area, occupied by the object classified as a "gutter block" (i.e., the block), that is output from the learned model LM, and a character information icon 502 representing that the detected (classified) object is a gutter block are superimposed on the input image to be displayed. Further, a box icon 503 having a shape enclosing an area, occupied by the object classified as an "excavation groove" (i.e., the groove), that is output from the learned model LM and a character information icon 504 representing that the detected (classified) object is a Groove which is one of the topographical shapes are superimposed on the input image to be displayed. This enables an operator or the like to easily recognize the detected objects and easily recognize the types of the detected objects. Further, the camera image display area of the display D1 may display the above-described predictive probability, specifically, the predictive probability that "gutter block" is present and the predictive probability that "excavation groove" is present, which are used for the determination performed by the determining unit 344. Then, the determining unit 344 classifies the scene in which the shovel 100 is present as a "scene for excavating in the proximity of the block" based on the type and positional relationship of the detected objects and the scene obtained from the learned model LM. At that time, the predictive probability classified as "scene for excavating in the proximity of the block" may also be displayed in the camera image display area of the display D1. Further, a level display (for example, five levels) indicating the danger level may be displayed. As a result, this enables the operator of the shovel 100 to easily check the classification determined to be a dangerous scene and its cause, and to quickly perform the work for reducing the danger level. Further, the determining unit 344 can also determine the work content for the scene type. For example, when an image of the dump truck at any position in the image is recognized and an image of the temporarily placed soil and sand mountain at another position in the image is recognized, the determining unit 344 can determine, based on the dump truck and its position, as well as the temporarily placed soil and sand mountain and its position, that the work content in this scene is a loading work. In FIG. 9, the determining unit 344 can determine that the work content in this scene is a crane work based on the position of the recognized image of a wire rope and the position of the recognized image of the bucket 6. In this way, the determining unit 344 can determine the work content based on the recognized object and position of the object by using the learning model. As the learned model LM, such as a support vector machine (SVM) or the like may be applied in addition to the neural network 401.

A converted image based on the input image (for example, the above-described viewpoint converted combined image)

may be displayed on the display D1. In this case, the box icon and the character information icon may be superimposed on a portion corresponding to an area occupied by an object on the converted image to be displayed.

In the storage unit 346, the learned model LM is stored. If the communication device 90 receives an updated learned model from the management device 200, that is, a learned model on which additional learning has been performed (hereinafter referred to as an "additionally learned model") as described later, the learned model LM stored in the storage unit 346 is updated to the received additionally learned model. This allows the determining unit 344 to utilize the additionally learned model on which additional learning has been performed in the management device 200, thereby improving the determination accuracy with respect to an object around the shovel 100 in accordance with the update of the learned model.

The management device 200 includes the control device 210, a communication device 220, a display device 230, an input device 240, and a computer graphic image generating device 250 (hereinafter referred to as a "CG image generating device").

The control device 210 is processing circuitry configured to control various operations of the management device 200. The control device 210 includes a determining unit 2101, a teaching data generating unit 2102, and a learning unit 2103 as functional units implemented by the CPU executing, for example, one or more programs stored in ROM or the non-volatile auxiliary storage device. The control device 210 includes storage units 2104 and 2105 as storage areas defined in the non-volatile internal memory or the like such as the auxiliary memory device.

The communication device 220 is a given device that connects to the communication network and communicates with the external devices such as the multiple shovels 100.

The display device 230 is, for example, a liquid crystal display or an organic EL display, and displays various information images under the control of the control device 210.

The input device 240 receives an operation input from a user. The input device 240 includes, for example, a touch panel mounted on the liquid crystal display or the organic EL display. Additionally, the input device 240 may include a touch pad, a keyboard, a mouse, a trackball, or the like. Information related to an operational state of the input device 240 is obtained by the control device 210.

The determining unit 2101 performs a determination related to an object around the shovel 100 based on the input images IM1 received from the multiple shovels 100, that is, the input images IM1 read from the storage unit 2104 (i.e., the path 2101A) by using the learned model LM, on which machine learning has been performed by the learning unit 2103, stored in the storage unit 2105. Specifically, the determining unit 2101 performs a determination related to an object around the shovel 100 based on the input images IM1 read from the storage unit 2104 by loading the learned model LM from the storage unit 2105 into the main storage device such as the RAM (i.e., the path 2101B) and by causing the CPU to execute the determination. More specifically, the determining unit 2101 sequentially inputs multiple input images IM1 stored in the storage unit 2104 into the learned model LM to perform determination related to an object around the shovel 100. A result 2101D determined by the determining unit 2101 is input to the teaching data generating unit 2102. At this time, the determined result 2101D may be input to the teaching data generating unit 2102 sequentially for each input image IM1, or may be input to the teaching data generating unit 2102 after being compiled into a list or the like, for example.

The teaching data generating unit 2102 (i.e., an example of the teaching information generating unit) generates teaching data (i.e., an example of teaching information) for the learning unit 2103 to perform machine learning on a learning model based on the multiple input images IM1 received from the multiple shovels 100. The teaching data represents a combination of a given input image IM1 and a correct answer to be output by the learning model in response to receiving the input image IM1 as an input of the learning model. The learning model is an object for machine learning and is naturally configured as in the learned model LM, e.g., is mainly configured by the neural network 401 described above.

For example, the teaching data generating unit 2102 reads the input images IM1 received from the multiple shovels 100 from the storage unit 2104 (i.e., the path 2102A) to display the input image IM1 on the display D1 and display a graphical user interface (GUI) for an administrator of the management device 200, an operator of the management device 200, or the like, to create the teaching data (hereinafter, referred to as a "teaching data creation GUI"). An administrator, an operator, or the like uses the input device 240 to operate the teaching data creation GUI and instruct a correct answer corresponding to each input image IM1 to create the teaching data in a format according to an algorithm of the learning model. In other words, the teaching data generating unit 2102 can generate multiple teaching data (i.e., a teaching data set) in accordance with an operation (i.e., a work) for the multiple input images IM1, performed by an administrator, an operator, or the like.

The teaching data generating unit 2102 generates the teaching data used by the learning unit 2103 to perform additional learning on the learned model LM based on the multiple input images IM1 received from the multiple shovels 100.

For example, the teaching data generating unit 2102 reads the multiple input images IM1 from the storage unit 2104 (i.e., the path 2102A) and displays the input images IM1 and the results (output results) 2101D determined by the determining unit 2101 corresponding to the input images IM1 side by side, respectively, on the display device 230. This allows an administrator or an operator of the management device 200 to select a combination corresponding to incorrect determination from the combinations of the input images IM1 and the corresponding determined results displayed on the display device 230 through the input device 240. An administrator, an operator, or the like can create the additional learning teaching data representing a combination of the input image IM1 that is an image of a combination corresponding to the incorrect determination, that is, the input image IM1 that causes the learned model LM to perform the incorrect determination, and the correct answer to be output by the learned model LM in response to receiving the input image IM1 as an input, by using the input device 240 to operate the teaching data creation GUI. In other words, the teaching data generating unit 2102 can generate multiple additional learning teaching data (i.e., the additional learning teaching data set) in accordance with an operation (a work) performed by an administrator, an operator, or the like on the input image IM1 corresponding to the incorrect determination in the learned model LM, selected from the multiple input images IM1.

That is, the teaching data generating unit 2102 generates the teaching data for generating the first learned model LM from the multiple input images IM1 received from the multiple shovels 100. Then, the teaching data generating unit 2102 generates, at a predetermined timing (hereinafter, referred to as an "additional learning timing"), the additional learning teaching data from the input image IM1 for which incorrect determination is performed in the learned model LM, selected from the input images IM1 received from the multiple shovels 100 after the recently learned model LM is installed in the multiple shovels 100.

Here, some of the input images IM1 received from the multiple shovels 100 may be used as a base of a validation data set for the learned model LM. That is, the input images IM1 received from the multiple shovels 100 may be sorted into the input image IM1 for generating the teaching data and the input image IM1 for generating a validation data set.

The additional learning timing may be a periodically specified timing, e.g., when one month has passed after the previous machine learning (or additional learning) is performed. The additional learning timing may be, for example, when the number of the input images IM1 exceeds a predetermined threshold value, that is, timing when a certain number of input images IM1, required for the additional learning performed by the learning unit 2103, are obtained.

The learning unit 2103 performs machine learning on the learning model to generate the learned model LM based on teaching data 2102B (i.e., a teaching data set) generated by the teaching data generating unit 2102. The generated learned model LM is stored in the storage unit 2105 (i.e., the path 2103B) after the accuracy validation is performed using a previously prepared validation data set.

The learning unit 2103 generates the additionally learned model by performing additional learning on the learned model LM read from the storage unit 2105 (i.e., the path 2103A) based on the teaching data (i.e., the teaching data set) generated by the teaching data generating unit 2102. After accuracy validation is performed on the additionally learned model by using the previously prepared validation data set, the learned model LM stored in the storage unit 2105 is updated (i.e., the path 2103B) with the additionally learned model on which the accuracy validation has been performed using the previously prepared validation data set.

For example, as described above, if the learning model is mainly configured by the neural network 401, the learning unit 2103 optimizes weight parameters by applying a known algorithm such as backpropagation to generate the learned model LM so that the error between the output of the learning model and the teaching data is reduced. The same applies to the generation of the additionally learned models.

Here, the first learned model LM generated from the learning model may be generated by an external device different from the management device 200. In this case, the teaching data generating unit 2102 may be configured to generate only the additional learning teaching data and the learning unit 2103 may be configured to generate only the additionally learned model.

The input images IM1 received from the multiple shovels 100 are stored (saved) in the storage unit 2104 through the communication device 220.

Here, the input images IM1 that have been used to generate the teaching data by the teaching data generating unit 2102 may be stored in a storage device other than the storage unit 2104.

The learned model LM is stored (saved) in the storage unit 2105. The learned model LM updated with the additionally learned model generated by the learning unit 2103 is transmitted to each of the multiple shovels 100 through the communication device 220 (i.e., an example of a model transmission unit) at a predetermined timing (hereinafter, referred to as a "model transmission timing"). This enables the identical updated learned model LM, that is, the additionally learned model, to be shared among the multiple shovels 100.

The model transmission timing may be when the learned model LM stored in the storage unit 2105 is updated, that is, a timing immediately after the learned model LM stored in the storage unit 2105 is updated or timing when a predetermined time elapses after the update. Additionally, the model transmission timing may be, for example, when a confirmation response is received by the communication device 220 in response to a notification of the update of the learned model LM transmitted to the multiple shovels 100 through the communication device 220 after the learned model LM has been updated.

Next, the specific operation of the shovel assist system will be described with reference to FIG. 15. FIG. 15 is a sequence diagram illustrating an example of an operation of the shovel assist system.

In step S10, the communication devices 90 of the multiple shovels 100 transmit the input image IM1 to the management device 200 at each image transmission timing. This allows the management device 200 to receive the input image IM1 from each of the shovels 100 through the communication device 220 and store the input image IM1 in the storage unit 2104.

In step S12, the determining unit 2101 of the management device 200 inputs the multiple input images IM1 that are received from the multiple shovels and that are stored in the storage unit 2104 into the learned model LM to perform a determining process.

In step S14, an administrator of the management device 200, an operator of the management device 200, or the like verifies a result determined by-using the learned model LM and specifies (selects) the input image IM1 for which incorrect determination is performed in the learned model LM from among the multiple input images IM1 through the input device 240.

In step S16, the teaching data generating unit 2102 of the management device 200 generates the additional learning teaching data set in accordance with an operation of the teaching data creation GUI performed by an administrator, an operator, or the like through the input device 240.

In step S18, the learning unit 2103 of the management device 200 performs additional learning on the learned model LM by using the additional learning teaching data set to generate the additionally learned model, and updates the learned model LM stored in the storage unit 2104 with the additionally learned model.

In step S20, the communication device 220 of the management device 200 transmits the updated learned model LM to each of the multiple shovels 100.

The timing at which the updated learned model LM is transmitted to the shovel 100 (i.e., the model transmission timing) may differ for each of the multiple shovels 100 as described above.

In step S22, each of the multiple shovels 100 updates the learned model LM stored in the storage unit 346 with the updated learned model received from the management device 200.

The CG image generating device 250 generates a computer graphic image (hereinafter, referred to as a "CG image") IM3 representing surroundings of the shovel 100 at a work site in accordance with an operation performed by an operator of the management device 200 or the like. For example, the CG image generating device 250 is mainly configured by a computer including, for example, the memory device such as the CPU and the RAM, the auxiliary storage device such as the ROM, the interface device for various inputs and outputs, and the like, and application software that enables an operator or the like to create the CG image IM3 is pre-installed. An operator or the like creates the CG image IM3 on the display screen of the CG image generating device 250 through a predetermined input device. This enables the CG image generating device 250 to generate the CG image IM3 representing surroundings of the shovel 100 at a work site in accordance with a work (i.e., an operation) performed by an operator of the management device 200. Additionally, the CG image generating device 250 may generate the CG image IM3 corresponding to a meteorological condition corresponding to the captured image, a meteorological condition different from the sunshine condition, a working environment in the sunshine condition, or the like based on the captured image (e.g., the input image IM1) of actual surroundings of the shovel 100. The CG image IM3 generated by the CG image generating device 250 is obtained by the control device 210.

The CG image IM3 may be generated (created) outside of the management device 200.

As in the above-described example, the control device 210 includes the determining unit 2101, the teaching data generating unit 2102, the learning unit 2103, and the storage units 2104 and 2105.

The determining unit 2101 performs determinations related to an object around the shovel 100 based on the multiple input images IM1 read from the storage unit 2104 (i.e., the path 2101A) and the multiple CG images IM3 read from the storage unit 2104 (i.e., the path 2101C) by using the learned model LM, stored in the storage unit 2105, on which machine learning has been performed by the learning unit 2103. Specifically, the determining unit 2101 loads the learned model LM from the storage unit 346 to the main storage device such as the RAM (i.e., the path 2101B) and performs a determination related to an object around the shovel 100 based on the input images IM1 and the CG images IM3 read from the storage unit 2104 by the CPU executing the learned model LM. More specifically, the determining unit 2101 performs a determination related to an object around the shovel 100 by sequentially inputting the multiple input images IM1 and the multiple CG images IM3 stored in the storage unit 2104 into the learned model LM. The results 2101D determined by the determining unit 2101 are input to the teaching data generating unit 2102. At this time, the determined results 2101D may be sequentially input to the teaching data generating unit 2102 for each of the multiple input images IM1 and CG images IM3, or may be input to the teaching data generating unit 2102 after being compiled into a list or the like, for example.

The teaching data generating unit 2102 generates teaching data used by the learning unit 2103 to perform machine learning on the learning model based on the multiple input images IM1 received from the multiple shovels 100 and the CG images generated by the CG image generating device 250 (stored in the storage unit 2104).

For example, the teaching data generating unit 2102 reads the input images IM1, received from the multiple shovels 100, and the CG images IM3, generated by the CG image generating device 250, from the storage unit 2104 (i.e., the paths 2102A and 2102C) and, together with the display of the input images IM1 and the CG images IM3 on the display D1, displays the teaching data creation GUI. An administrator, an operator, or the like creates the teaching data in a format according to an algorithm of the learning model by using the input device 240 to operate the teaching data creation GUI to instruct correct answers corresponding to the respective input images IM1 or the respective CG images IM3. In other words, the teaching data generating unit 2102 can generate multiple teaching data (i.e., the teaching data set) in accordance with an operation (a work) performed by an administrator or an operator on the multiple input images IM1 and CG images IM3.

The teaching data generating unit 2102 generates the teaching data for the learning unit 2103 to perform additional learning on the learned model LM based on the multiple input images IM1 received from the multiple shovels 100 and the CG images IM3 generated by the CG image generating device 250 (stored in the storage unit 2104).

The teaching data generating unit 2102 reads the multiple input images IM1 and the multiple CG images IM3 from the storage unit 2104 (i.e., the paths 2102A and 2102C) and displays each of the input images IM1 or the CG images IM3 and the results determined by the determining unit 2101 (using the learned model LM) (i.e., the output results) corresponding to the respective input images IM1 or the respective CG images IM3 side by side on the display device 230. This enables an administrator or an operator of the management device 200 to select a combination corresponding to the incorrect determination from combinations of the input images IM1 or the CG images IM3 displayed on the display device 230 and corresponding results determined by using the learned model LM, through the input device 240. An administrator, an operation, or the like can create the additional learning teaching data representing a combination of the input image IM1 or the CG image IM3 corresponding to the combination of the incorrect determination and a correct answer to be output by using the learned model LM in response to the input image IM1 or the CG image IM3 being input, by using the input device 240 to operate the teaching data creation GUI. In other words, the teaching data generating unit 2102 can generate multiple additional learning teaching data (i.e., the additional learning teaching data set) in accordance with an operation (a work) performed by an administrator, an operator, or the like for at least one of the input image IM1 or the CG image IM3, selected from the multiple input images IM1 and CG images IM3, corresponding to the incorrect determination in the learned model LM. This can generate the teaching data by using the CG image IM3 in addition to the input image IM1 collected from the multiple shovels 100, thereby providing the teaching data sufficiently. In particular, in the CG image IM3, various work site conditions, that is, various environmental conditions can be virtually created. Therefore, by using the CG image IM3 to generate the teaching data set, the learned model LM can achieve relatively high determination accuracy under various work site conditions at an earlier timing.

Because the CG image IM3 generated by the CG image generating device 250 is artificially created, the presence or absence, the position, and the like of a monitoring target object, such as a person, a truck, a pylon, or a utility pole in the CG image IM3 are already known. That is, a correct answer to be output by the learned model LM in response to the CG image IM3 being input is already known. Thus, the CG image generating device 250 can output, with the CG image IM3, data related to a correct answer to be output by the learned model LM in response to the CG image IM3 being input (hereinafter, referred to as "correct answer data") to the control device 210. Therefore, the control device 210 (i.e., the teaching data generating unit 2102) can automatically extract the incorrect determination in a determining process performed by using the learned model LM (i.e., by the determining unit 2101) in response to the CG image IM3 being input based on a correct answer data input from the CG image generating device 250, and automatically generate multiple teaching data (i.e., the teaching data set) for additional learning, representing a combination of the CG image IM3 corresponding to the extracted incorrect determination and a correct answer to be output by the learned model LM in response to the CG image IM3 being input. The learning unit 2103 can perform additional learning on the learned model LM, such as the above-described backpropagation, based on the teaching data automatically generated by the teaching data generating unit 2102. That is, the control device 210 can automatically generate the additionally learned model based on the CG image IM3 and the correct answer data generated by the CG image generating device 250.

Figure 16:
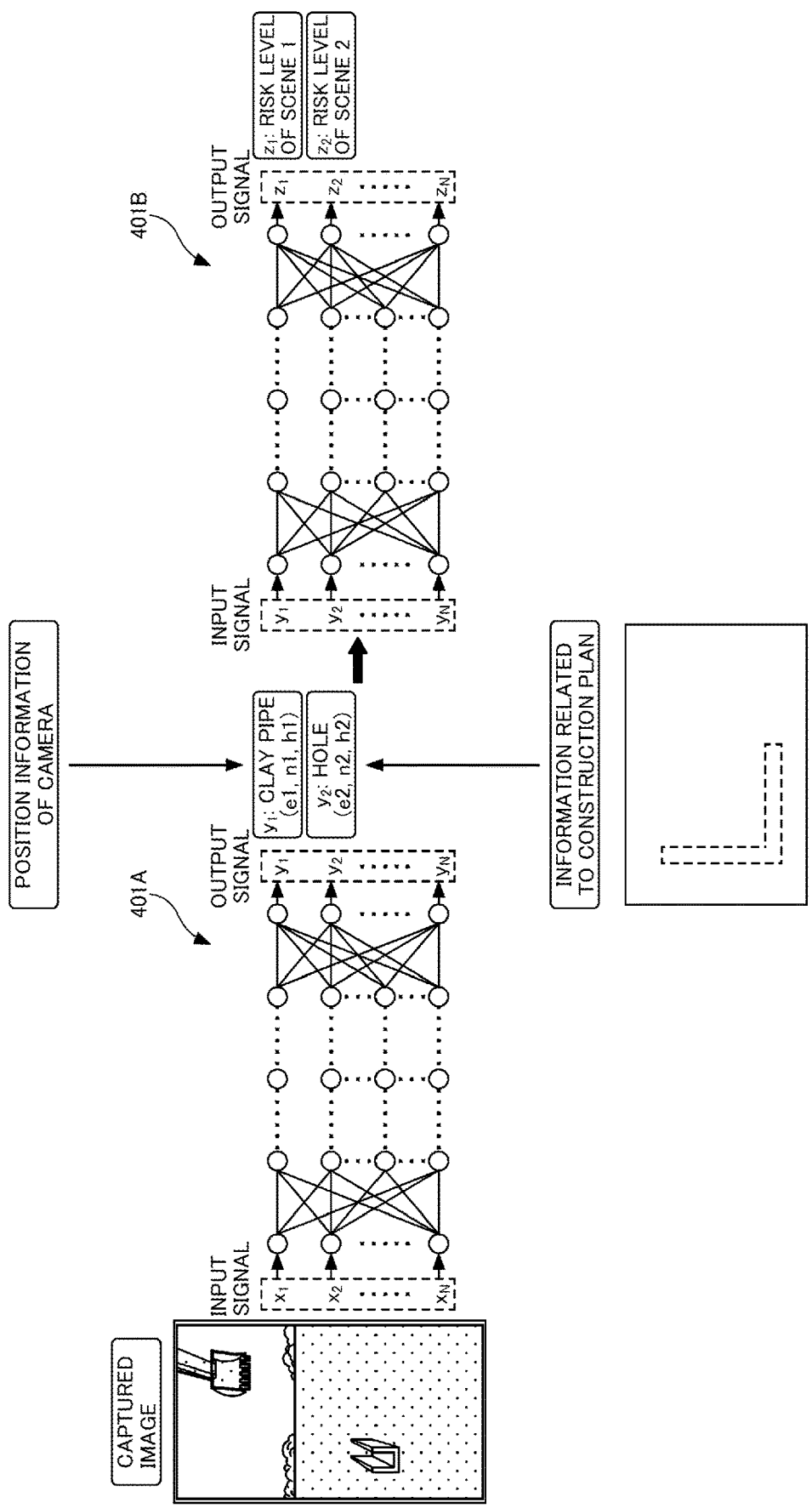
FIG. 16 is a conceptual diagram illustrating another example of determination processing by the danger determining unit.

Next, another example of the determination process by the determining unit 2101 will be described with reference to FIG. 16. FIG. 16 is a conceptual diagram illustrating another example of the determination process by the determining unit 2101. In the example illustrated in FIG. 16, the learned model LM is mainly configured by a first neural network 401A and a second neural network 401B.

The first neural network 401A to receive an input of an input image as an input signal x and output a probability (i.e., predictive probability) that an object is present for each type of objects corresponding to the predetermined monitoring target list and a positional relationship of the object as an output signal y. In the example illustrated in FIG. 16, the input image is a captured image captured by the front camera 70F, and the objects in the monitoring target list include a clay pipe, a hole, and the like.

For example, when the captured image as illustrated in FIG. 16 is input as the input signal x, the first neural network 401A estimates the presence of the clay pipe with high probability. Then, the first neural network 401A derives the position (for example, latitude, longitude, and altitude) of the clay pipe based on the information related to the position of the front camera 70F. The information related to the position of the front camera 70F is, for example, the latitude, longitude, and altitude of the front camera 70F, and is derived based on the output of the positioning device 73. Specifically, the first neural network 401A can derive the position of the clay pipe based on the position and size of the image of the clay pipe in the captured image. In the example illustrated in FIG. 16, the first neural network 401A outputs the estimation result of the presence of the clay pipe at an east longitude e1, a north latitude n1, and an altitude h1 as the output signal y.

Further, the first neural network 401A can output the probability (predictive probability) that an object presents for each type of object in a predetermined monitoring target list and the position information of the object based on information related to the construction plan. In the example illustrated in FIG. 16, the first neural network 401A derives the position of the hole (for example, latitude, longitude, and altitude) based on information related to the area for the hole to be excavated for burying a gutter block as illustrated in FIG. 11. Specifically, the first neural network 401A can derive the position of the hole based on the information related to the position included in the design data. In the example illustrated in FIG. 16, the first neural network 401A outputs the recognition result of the hole to be formed at an east longitude e2, a north latitude n2, and an altitude h2 as the output signal y.

The output signal y of the first neural network 401A is input to the second neural network 401B as an input signal y. The second neural network 401B can output the danger level, as the output signal z, at that time for each scene (situation) based on the positional relationship of each object whose presence is estimated or recognized by the first neural network 401A.

Figure 17:
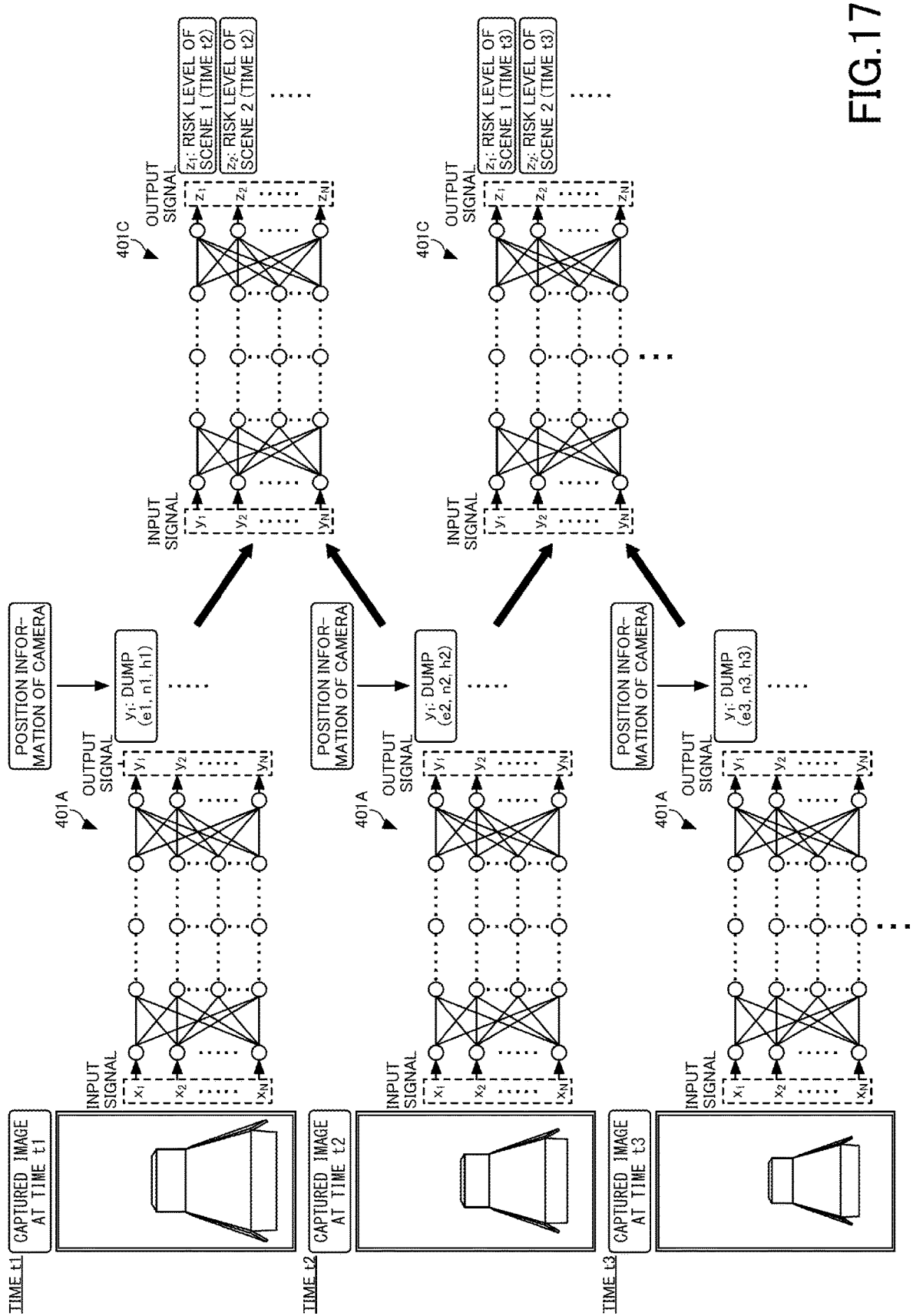
FIG. 17 is a conceptual diagram illustrating yet another example of determination processing by the danger determining unit.

Next, another example of the determination process by the determining unit 2101 will be described with reference to FIG. 17. FIG. 17 is a conceptual diagram illustrating another example of determination processing by the determining unit. In the example illustrated in FIG. 17, the learned model LM is mainly configured by the first neural network 401A and a third neural network 401C.

In the example illustrated in FIG. 17, the danger level when the dump truck stops in front of the shovel 100 is determined. The dump truck is stopped in front of the shovel 100 so that the shovel 100 can load the sand on the loading platform of the dump truck. However, in the example illustrated in FIG. 17, the dump truck has started to move away from the shovel 100, against the intention of the driver of the dump truck, because the side brake is not applied properly. The loading platform of the dump truck has not yet been loaded with the sand.

In the example illustrated in FIG. 17, when the captured image as illustrated in FIG. 17 is input as the input signal x at time t1, the first neural network 401A recognizes the dump truck. Then, the first neural network 401A derives the position (for example, latitude, longitude, and altitude) of the dump truck based on the information related to the position of the front camera 70F. In the example illustrated in FIG. 17, the first neural network 401A outputs the recognition result of the dump truck at the east longitude e1, the north latitude n1, and the altitude h1 as the output signal y at the time t1.

Further, when the captured image as illustrated in FIG. 17 is input as the input signal x at time t2, the first neural network 401A recognizes the dump truck located at a position farther from the shovel 100 than at the time t1. Then, the first neural network 401A derives the position (for example, latitude, longitude, and altitude) of the dump truck based on the information related to the position of the front camera 70F. In the example illustrated in FIG. 17, the first neural network 401A outputs the recognition result of the dump truck at the east longitude e2, the north latitude n2, and the altitude h2 as the output signal y at the time t2.

Further, when the captured image as illustrated in FIG. 17 is input as the input signal x at time t3, the first neural network 401A recognizes the dump truck located at a position farther from the shovel 100 than at the time t2. Then, the first neural network 401A derives the position (for example, latitude, longitude, and altitude) of the dump truck based on the information related to the position of the front camera 70F. In the example illustrated in FIG. 17, the first neural network 401A outputs the recognition result of the dump truck at an east longitude e3, a north latitude n3, and an altitude h3 as the output signal y at the time t3.

The output signal y of the first neural network 401A at a predetermined time in the past and the output signal y of the first neural network 401A at the present time are input to the third neural network 401C as the input signal y. The third neural network 401C can output the danger level, as the output signal z, of the present time for each scene (situation) based on the positional relationship of the object at each time recognized by the first neural network 401A.

In the example illustrated in FIG. 17, at the time t2, the third neural network 401C receives the output signal y of the first neural network 401A at time t1 and the output signal y of the first neural network 401A at the time t2. The third neural network 401C can output the danger level of the time t2 for each scene (situation) based on the position of the dump truck at the time t1 and the position of the dump truck at the time t2, recognized by the first neural network 401A.

In the example illustrated in FIG. 17, Scene 1 is, for example, a scene (situation) in which the dump truck to which the side brake is not properly applied moves forward. Scene 2 is, for example, a scene (situation) in which the dump truck to which the side brake is not properly applied moves backward. The third neural network 401C can determine that the dump truck is moving forward, and can output that the danger level at Scene 1 is high based on the position of the dump truck at the time t1 and the position of the dump truck at the time t2, recognized by the first neural network 401A.

Further, at the time t3, the third neural network 401C receives the output signal y of the first neural network 401A at time t2 and the output signal y of the first neural network 401A at the time t3. The third neural network 401C can output the danger level of the time t3 for each scene (situation) based on the position of the dump truck at the time t2 and the position of the dump truck at the time t3, recognized by the first neural network 401A.

The third neural network 401C can determine that the dump truck is moving forward, and can output that the danger level at Scene 1 is further high based on the position of the dump truck at the time t2 and the position of the dump truck at the time t3, recognized by the first neural network 401A.

Figure 18:
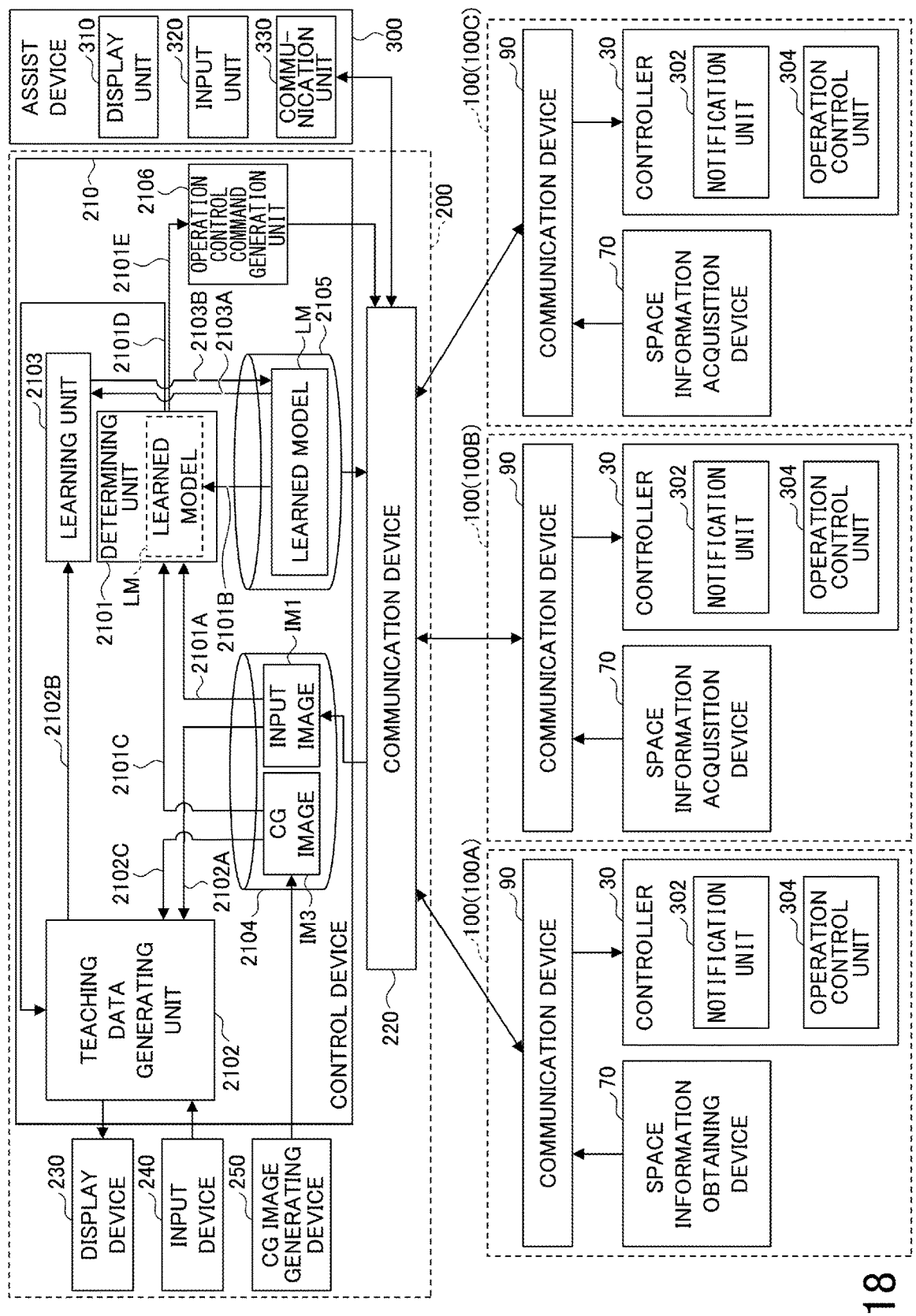
FIG. 18 is a diagram illustrating another configuration example of a shovel assist system.

Next, another configuration example of the shovel assist system using the neural network will be described with reference to FIG. 18. FIG. 18 is a diagram illustrating another configuration example of a shovel assist system and corresponds to FIG. 13.

Further, FIG. 18 illustrates a configuration in which each of the three shovels 100 (a shovel 100A, a shovel 100B, and a shovel 100C) is wirelessly connected to the communication device 220 of the management device 200 via the communication device 90. Further, FIG. 18 illustrates a configuration in which the assist device 300 including a display unit 310, an input unit 320, and a communication unit 330 is wirelessly connected to the communication device 220 of the management device 200 via the communication unit 330.

The management device 200 constituting the shovel assist system illustrated in FIG. 18 is different from the management device 200 illustrated in FIG. 13 mainly in that the control device 210 includes an operation control command generation unit 2106. Further, each of the shovels 100 illustrated in FIG. 18 is different from the shovel 100 illustrated in FIG. 13 mainly in that the determining device 34 is omitted.

Specifically, in the example illustrated in FIG. 18, the operation control command generation unit 2106, which is a function of the control device 210 in the management device 200, functions same as the determining unit 344, which is a function of the determining device 34 in the shovel 100 illustrated in FIG. 13. Specifically, the operation control command generation unit 2106 can generate an operation control command for the operation control unit 304, which is a function of the controller 30 mounted in the shovel 100, based on a determination result 2101E of the determining unit 2101. The determination result 2101E is, for example, same as the determination result 2101D.

Therefore, in the example illustrated in FIG. 18, the operation control command generation unit 2106 in the management device 200 can individually function the operation control unit 304 in the controller 30 mounted in each of the multiple shovels 100 (the shovel 100A, the shovel 100B, and the shovel 100C) via the wireless communication.

Further, the operation control command generation unit 2106 in the management device 200 can display the shovel surrounding image on the display unit 310 in the assist device 300, for example, in response to an input by the operator using the assist device 300 via the input unit 320 of the assist device 300. Further, the operation control command generation unit 2106 can display the determination result by the determining unit 2101 on the display unit 310.

Figure 19:
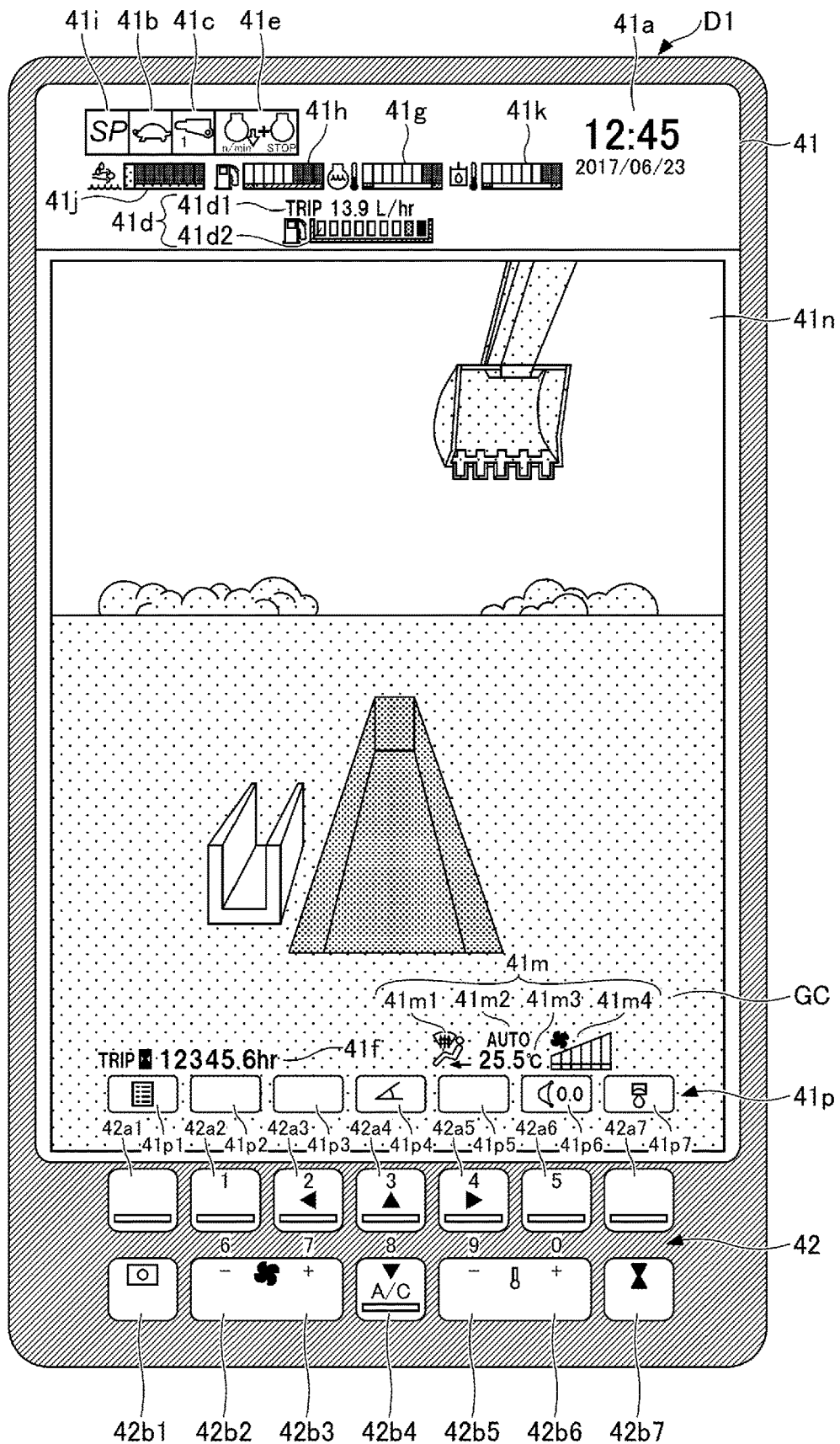
FIG. 19 is a diagram illustrating a configuration example of an image display portion and an operation unit of a display.

Next, another configuration example of the image display portion 41 and the operation unit 42 of the display D1 will be described with reference to FIG. 19. FIG. 19 is a diagram illustrating another configuration example of the image display portion 41 and the operation unit 42 of the display D1. In the example illustrated in FIG. 19, a state in which the input image of FIG. 5 is displayed on the image display portion 41 is illustrated.

First, the image display portion 41 will be described. As illustrated in FIG. 19, the image display portion 41 includes a date and time display area 41a, a driving mode display area 41b, an attachment display area 41c, a fuel consumption display area 41d, an engine control state display area 41e, an engine operating time display area 41f, a cooling water temperature display area 41g, a fuel remaining amount display area 41h, a rotation speed mode display area 41i, a urea water remaining amount display area 41j, a hydraulic oil temperature display area 41k, an air conditioner operation state display area 41m, an image display area 41n, and a menu display area 41p.

The driving mode display area 41b, the attachment display area 41c, the engine control state display area 41e, the rotation speed mode display area 41i, and the air conditioner operation state display area 41m are areas for displaying setting state information which is information related to settings state of the shovel 100. The fuel consumption display area 41d, the engine operating time display area 41f, the cooling water temperature display area 41g, the fuel remaining amount display area 41h, the urea water remaining amount display area 41j, and the hydraulic oil temperature display area 41k are areas for displaying operation state information which is information related to operation state of the shovel 100.

Specifically, the date and time display area 41a is an area for displaying the current date and time. The driving mode display area 41b is an area for displaying the current driving mode. The attachment display area 41c is an area for displaying an image representing an attachment currently attached. The fuel consumption display area 41d is an area for displaying fuel consumption information calculated by the controller 30. The fuel consumption display area 41d includes an average fuel consumption display area 41d1 for displaying a lifetime average fuel consumption or a section average fuel consumption, and an instantaneous fuel consumption display area 41d2 for displaying an instantaneous fuel consumption.

The engine control state display area 41e is an area for displaying a control state of the engine 11. The engine operating time display area 41f is an area for displaying a cumulative operating time of the engine 11. The cooling water temperature display area 41g is an area for displaying a current temperature state of the engine cooling water. The fuel remaining amount display area 41h is an area for displaying a remaining amount state of the fuel stored in a fuel tank. The rotation speed mode display area 41i is an area for displaying an image of a current rotation speed mode set by the engine rotation adjustment dial 75. The urea water remaining amount display area 41*j* is an area for displaying a remaining amount state of the urea water stored in a urea water tank as an image. The hydraulic oil temperature display area 41*k* is an area for displaying a temperature state of the hydraulic oil in the hydraulic oil tank.

The air conditioner operation state display area 41*m* includes an air outlet display area 41*m*1 for displaying a current position of the air outlet, an operation mode display area 41*m*2 for displaying a current operation mode, a temperature display area 41*m*3 for displaying a current set temperature, and an air volume display area 41*m*4 for displaying a current set air volume.

The image display area 41*n* is an area for displaying an image outputted by the space recognition device 70 or the like. In the example illustrated in FIG. 19, the image display area 41*n* displays an image captured by the front camera. An overhead image or a rear image may be displayed in the image display area 41*n*. The overhead image is, for example, a virtual viewpoint image generated by the control unit 40, and is generated based on the images obtained by each of the back camera 70B, the left camera 70L, and the right camera 70R. Further, a shovel figure corresponding to the shovel 100 may be arranged in the central portion of the overhead image. This is for the operator to intuitively grasp the positional relationship between the shovel 100 and the objects present around the shovel 100. The rear image is an image that reflects the space behind the shovel 100, and includes an image of a counterweight. The rear image is, for example, a real viewpoint image generated by the control unit 40, and is generated based on the image obtained by the back camera 70B. In the example illustrated in FIG. 19, the image display area 41*n* is a vertically long area, but the image display area 41*n* may be a horizontally long area.

A menu display area 41*p* includes tabs 41*p*1 to 41*p*7. In the example illustrated in FIG. 19, tabs 41*p*1 to 41*p*7 are arranged from left to right sides at the bottom of the image display portion 41 at intervals. Icons for displaying various information are displayed on the tabs 41*p*1 to 41*p*7.

A menu detail item icon for displaying a menu detail item is displayed on a tab 41*p*1. When the tab 41*p*1 is selected by the operator, the icons displayed on tabs 41*p*2 to 41*p*7 are switched to the icons associated with the menu detail items.

An icon for displaying information about the digital level is displayed on a tab 41*p*4. When the tab 41*p*4 is selected by the operator, currently displayed image switches to a screen illustrating information related to the digital level. The screen illustrating information related to the digital level may be displayed by superimposing the information on the currently displayed image or reducing the currently displayed image.

An icon for displaying information related to informatization construction is displayed on a tab 41*p*6. When the tab 41*p*6 is selected by the operator, the currently displayed image is switched to a screen illustrating information related to the informatization construction. The screen illustrating information related to the informatization construction may be displayed by superimposing the information on the currently displayed image or reducing the currently displayed image.

An icon for displaying information related to a crane mode is displayed on a tab 41*p*7. When the tab 41*p*7 is selected by the operator, the currently displayed image switches to a screen illustrating information related to the crane mode. The screen illustrating information related to the crane mode may be displayed by superimposing the information on the currently displayed image or reducing the currently displayed image.

Icons are not displayed on tabs 41*p*2, 41*p*3, 41*p*5. Therefore, even if the tabs 41*p*2, 41*p*3, and 41*p*5 are operated by the operator, the image displayed on the image display portion 41 does not change.

The icons displayed on the tabs 41*p*1 to 41*p*7 are not limited to the above examples, and icons for displaying other information may be displayed.

Next, the operation unit 42 will be described. As illustrated in FIG. 19, the operation unit 42 is configured by one or more button-type switches on which the operator selects the tabs 41*p*1 to 41*p*7, inputs settings, and the like. In the example illustrated in FIG. 19, the operation unit 42 includes seven switches 42*a*1 to 42*a*7 arranged in the upper stage and seven switches 42*b*1 to 42*b*7 arranged in the lower stage. The switches 42*b*1 to 42*b*7 are arranged below the switches 42*a*1 to 42*a*7, respectively. However, the number, form, and arrangement of the switches of the operation unit 42 are not limited to the above examples, and functions of multiple button-type switches may be integrated into one by, for example, a jog wheel or a jog switch. The operation unit 42 may be apart from the display D1. Further, the tabs 41*p*1 to 41*p*7 may be directly operated by a touch panel in which the image display portion 41 and the operation unit 42 are integrated.

The switches 42*a*1 to 42*a*7 are arranged below the tabs 41*p*1 to 41*p*7, respectively, corresponding to the tabs 41*p*1 to 41*p*7, and function as switches for selecting tabs 41*p*1 to 41*p*7, respectively. Because the switches 42*a*1 to 42*a*7 are arranged below the tabs 41*p*1 to 41*p*7, respectively, corresponding to the tabs 41*p*1 to 41*p*7, the operator can intuitively select the tabs 41*p*1 to 41*p*7. In the example illustrated in FIG. 19, for example, when the switch 42*a*1 is operated, the tab 41*p*1 is selected. Then the menu display area 41*p* is changed from the one-stage display to the two-stage display, and the icons corresponding to the first menu are displayed on the tabs 41*p*2 to 41*p*7. Further, the size of the currently displayed image is reduced in response to the change of the menu display area 41*p* from the one-stage display to the two-stage display. At this time, since the size of the overhead image is maintained without being changed, the visibility when the operator checks the surroundings of the shovel 100 does not deteriorate.

The switch 42*b*1 is a switch for switching the captured image displayed in the image display area 41*n*. Each time the switch 42*b*1 is operated, the captured image displayed in the image display area 41*n* is switched between, for example, a rear image, a left image, a right image, and an overhead image.

The switches 42*b*2 and 42*b*3 are switches for adjusting the air volume of the air conditioner. In the example of FIG. 19, the air volume of the air conditioner is reduced when the switch 42*b*2 is operated, and the air volume of the air conditioner is increased when the switch 42*b*3 is operated.

The switch 42*b*4 is a switch for switching ON/OFF of the cooling/heating function. In the example of FIG. 19, the cooling/heating function is switched ON/OFF each time the switch 42*b*4 is operated.

The switches 42*b*5 and 42*b*6 are switches for adjusting the set temperature of the air conditioner. In the example of FIG. 19, the set temperature is lowered when the switch 42*b*5 is operated, and the set temperature is raised when the switch 42*b*6 is operated.

The switch 42*b*7 is a switch capable of switching the display of the engine operating time display area 41*f*.

Further, the switches 42*a*2 to 42*a*6 and 42*b*2 to 42*b*6 are configured so that numbers displayed on each switch or in the vicinity of each switch can be input. Further, the switches 42*a*3, 42*a*4, 42*a*5, and 42*b*4 are configured to be able to move a cursor to the left, up, right, and down, respectively, when the cursor is displayed on the menu screen.

Note that the functions given to the switches 42*a*1 to 42*a*7 and 42*b*1 to 42*b*7 are examples, and may be configured so that other functions can be executed.

As described above, when the tab 41*p*1 is selected while the predetermined image is displayed in the image display area 41*n*, the first menu detailed items are displayed on the tabs 41*p*2 to 41*p*7 with the predetermined image displayed. Therefore, the operator can check the first menu detailed items while checking the predetermined image.

Further, in the image display area 41*n*, an overhead image is displayed without changing the size before and after the tab 41*p*1 is selected. Visibility does not deteriorate when the operator checks the surroundings of the shovel 100.

Figure 20:
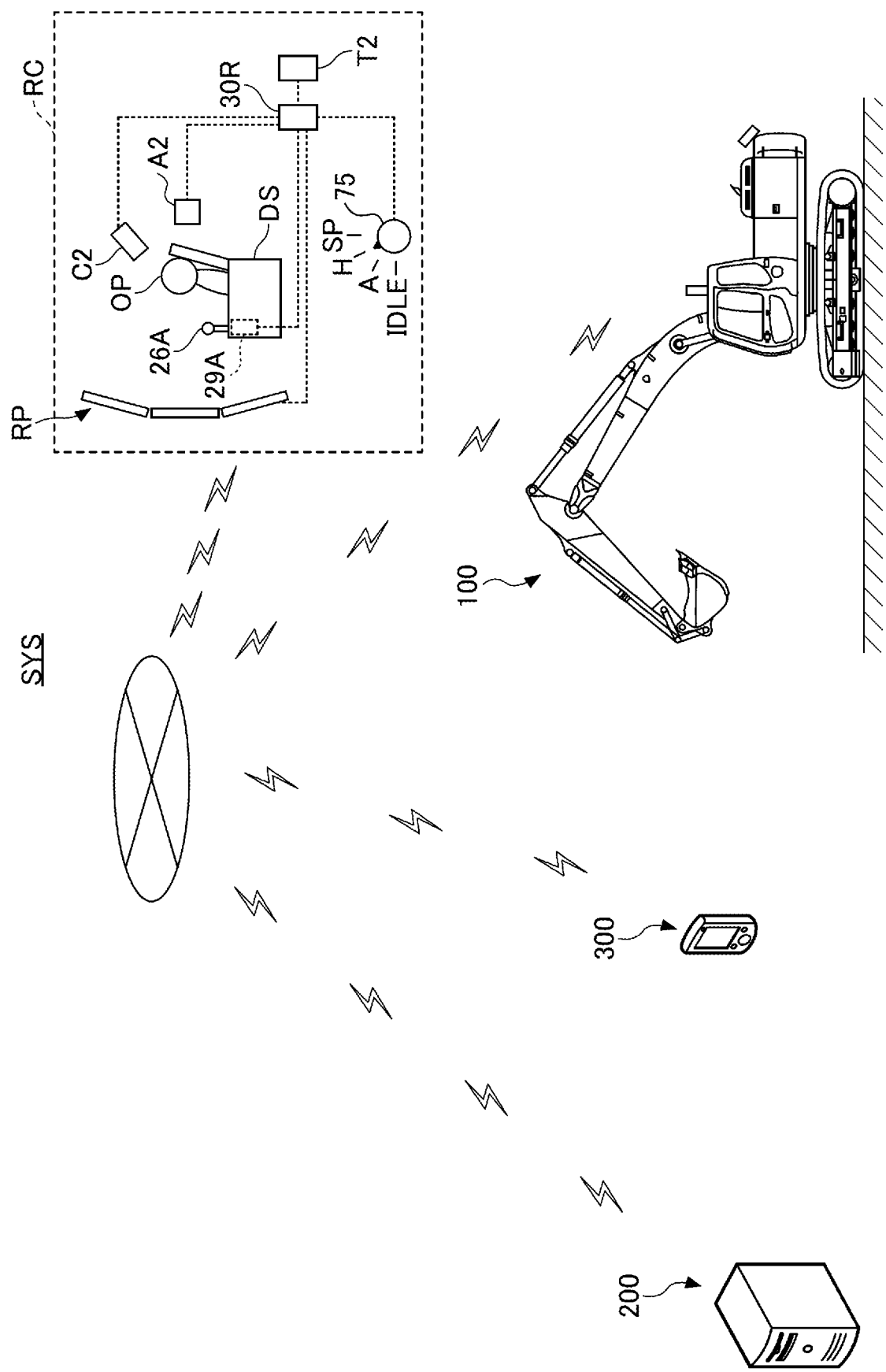
FIG. 20 is a schematic view illustrating an example of the construction system.

Next, a construction system SYS will be described with reference to FIG. 20. FIG. 20 is a schematic view illustrating an example of the construction system SYS. As illustrated in FIG. 20, the construction system SYS includes the shovel 100, the management device 200, and the assist device 300. The construction system SYS is configured to be able to assist construction by one or more shovels 100.

The information obtained by the shovel 100 may be shared with an administrator, other shovel operators, and the like through the construction system SYS. Each of the shovel 100, the management device 200, and the assist device 300 constituting the construction system SYS may be a single unit or multiple units. In the example illustrated in FIG. 20, the construction system SYS includes one shovel 100, one management device 200, and one assist device 300.

The management device 200 is typically a fixed terminal device, for example, a server computer (so-called a cloud server) installed in a management center or the like outside the construction site. Further, the management device 200 may be, for example, an edge server set at the construction site. Further, the management device 200 may be a portable terminal device (for example, a laptop computer terminal, a tablet terminal, or a mobile terminal such as a smartphone).

The assist device 300 is typically the mobile terminal device, for example, the laptop computer terminal, the tablet terminal, the smartphone, or the like carried by a worker or the like at the construction site. The assist device 300 may be a mobile terminal carried by the operator of the shovel 100. The assist device 300 may be the fixed terminal device.

At least one of the management device 200 or the assist device 300 may include a monitor and an operating device for remote control. In this case, the operator using the management device 200 or the assist device 300 may operate the shovel 100 while using the remote control operating device. The operating device for remote control is communicably connected to the controller 30 mounted in the shovel 100 through a wireless communication network such as a short-range wireless communication network, a mobile phone communication network, or a satellite communication network.

Further, various information images (for example, image information illustrating the surroundings of the shovel 100, various setting screens, etc.) displayed on the display D1 installed in the cabin 10 may be displayed on the display device connected to at least one of the management device 200 or the assist device 300. The image information representing the surrounding state of the shovel 100 may be generated based on the image captured by the capture device (for example, the capture device as the space recognition device 70). As a result, the administrator who uses the management device 200, a worker who uses the assist device 300, or the like can remotely control the shovel 100 and make various settings related to the shovel 100 while checking the surroundings of the shovel 100.

For example, in the construction system SYS, the controller 30 of the shovel 100 may transmit information to at least one of the management device 200 or the assist device 300. The information is related to at least one of time and place when a predetermined switch for initiating autonomous operation is pressed, a target trajectory used to operate the shovel 100 autonomously, an actual trajectory followed by a predetermined part during autonomous operation, or the like. At that time, the controller 30 may transmit the image captured by the space recognition device 70 to at least one of the management device 200 or the assist device 300. The image may be multiple images captured during the autonomous operation. Further, the controller 30 may transmit information related to at least one of data on a movement content of the shovel 100 during the autonomous operation, data on a pose of the shovel 100, and data on a pose of the excavation attachment, or the like, to at least one of the management device 200 or the assist device 300. As a result, the administrator who uses the management device 200 or the worker who uses the assist device 300 can obtain information related to the shovel 100 during the autonomous operation.

In this way, in the management device 200 or the assist device 300, types and positions of the monitoring targets outside the monitoring area of the shovel 100 are stored in the storage unit in chronological order.

In this way, the construction system SYS enables to share information related to the shovel 100 with the administrator, other shovel operators, and the like.

As illustrated in FIG. 20, the communication device mounted in the shovel 100 may be configured to transmit/receive information to/from a communication device T2 installed in a remote control room RC via wireless communication. In the example illustrated in FIG. 20, the communication device mounted in the shovel 100 and the communication device T2 are configured to transmit/receive information via the fifth generation mobile communication line (5G line), the LTE line, the satellite line, or the like.

In the remote control room RC, a remote controller 30R, a sound output device A2, an indoor capture device C2, a display device RP, the communication device T2, and the like are installed. Further, in the remote control room RC, a driver's seat DS for the operator OP who remotely controls the shovel 100 is installed.

The remote controller 30R is an arithmetic unit that executes various arithmetic operations. In the example illustrated in FIG. 20, the remote controller 30R, similar to the controller 30, is configured by a microprocessor including the CPU and the memory. Various functions of the remote controller 30R are implemented by the CPU executing a program stored in the memory.

The sound output device A2 is configured to output sound. In the example illustrated in FIG. 20, the sound output device A2 is a speaker, and is configured to reproduce the sound collected by the sound collecting device (not illustrated) attached to the shovel 100.

The indoor capture device C2 is configured to capture an image of the inside of the remote control room RC. In the example illustrated in FIG. 20, the indoor capture device C2 is a camera installed inside the remote control room RC to take an image of the operator OP seated in the driver's seat DS.

The communication device T2 is configured to control wireless communication with the communication device attached to the shovel 100.

In the example illustrated in FIG. 20, the driver's seat DS has the same structure as the driver's seat installed in the cabin of a general shovel. Specifically, a left console box is arranged on the left side of the driver's seat DS, and a right console box is arranged on the right side of the driver's seat DS. A left operation lever is arranged at the front end of the upper surface of the left console box, and a right operation lever is arranged at the front end of the upper surface of the right console box. Further, a driving lever and a driving pedal are arranged in front of the driver's seat DS. Further, the engine rotation adjustment dial 75 is arranged at the center of the upper surface of the right console box. Each of the left operating lever, the right operating lever, the driving lever, the driving pedal, and the engine rotation adjustment dial 75 constitutes an operating device 26A.

The operating device 26A is provided with an operating sensor 29A for detecting an operation content of the operating device 26A. The operating sensor 29A is, for example, an inclination sensor that detects an inclination angle of the operation lever, an angle sensor that detects a swing angle around the swing axis of the operation lever, and the like. The operating sensor 29A may be configured by other sensors such as a pressure sensor, a current sensor, a voltage sensor, or a distance sensor. The operating sensor 29A outputs information related to the detected operation content of the operating device 26A to the remote controller 30R. The remote controller 30R generates an operation signal based on the received information, and transmits the generated operation signal to the shovel 100. The operating sensor 29A may be configured to generate an operation signal. In this case, the operating sensor 29A may output the operation signal to the communication device T2 without going through the remote controller 30R.

The display device RP is configured to display information related to the situation around the shovel 100. In the example illustrated in FIG. 20, the display device RP is a multi-display configured by nine monitors having three vertical rows and three horizontal rows. The display device RP is configured to be able to display the state of the front, left, and right spaces of the shovel 100. Each monitor is a liquid crystal monitor, an organic EL monitor, or the like. The display device RP may be configured by one or more curved monitors or may be configured by a projector.

The display device RP may be a display device capable of being worn by the operator OP. For example, the display device RP is a head-mounted display, and may be configured to be able to transmit/receive information to/from the remote controller 30R via wireless communication. The head-mounted display may be connected to the remote controller by wire. The head-mounted display may be a transmissive head-mounted display or a non-transmissive head-mounted display. The head-mounted display may be a monocular head-mounted display or a binocular head-mounted display.

The display device RP is configured to display an image for the operator OP in the remote control room RC to visually recognize the surroundings of the shovel 100. That is, the display device RP displays an image so that the operator can check the situation around the shovel 100 as being in the cabin 10 of the shovel 100, even though the operator is in the remote control room RC.

Next, with reference to FIG. 21, another configuration example of the construction system SYS will be described. In the example illustrated in FIG. 21, the construction system SYS is configured to assist construction by the shovel 100. Specifically, the construction system SYS includes a communication device CD and a control device CTR that communicate with the shovel 100. The control device CTR is configured to determine the dangerous situation based on the information obtained by the information obtaining device E1.

Alternatively, the control device CTR may be configured to estimate the construction situation existing at a lapse of a predetermined time from current time based on the information obtained by the information obtaining device E1 to determine the dangerous situation based on the information related to the estimated construction situation. Alternatively, the control device CTR may be configured to determine the danger level based on the estimated construction situation to determine that the dangerous situation is occurring when the danger level exceeds the predetermined value.

Alternatively, the control device CTR may be configured to determine the scene at the construction site based on the information obtained by the information obtaining device E1. Alternatively, the control device CTR may be configured to estimate the scene of the construction site based on schedule information after the predetermined time.

As described above, the shovel 100 according to the embodiment of the present disclosure includes the lower traveling structure 1, the upper swing structure 3 rotatably mounted on the lower traveling structure 1, the non-volatile storage device NM provided in the upper swing structure 3, the information obtaining device E1 that obtains information related to construction, and the controller 30 as a control device to control a notification device that is at least one of a display D1 or a sound output device D2. The controller 30 is configured to operate the notification device when the dangerous situation is determined to occur based on the information obtained by the information obtaining device E1 and the information stored in the danger information database DB, which is the database in the non-volatile storage device NM. Alternatively, the controller 30 may be configured to estimate the construction situation existing at a lapse of a predetermined time from current time based on the information obtained by the information obtaining device E1 to operate the notification device when the dangerous situation is determined to occur based on the information related to the estimated construction situation and the information stored in the danger information database DB in the non-volatile storage device NM. According to this configuration, the shovel 100 can prevent an actual occurrence of the dangerous situation.

The controller 30 may be configured to determine the danger level based on the estimated construction situation and the danger information database DB stored in the non-volatile storage device NM to determine that the dangerous situation will occur when the danger level exceeds the predetermined value.

The shovel 100 may display information related to the dangerous situation determined to occur on the display D1. This is to communicate more accurately to the operator the details of the dangerous situation that may occur.

Information related to the construction may include an image of the surroundings of the shovel 100, may include information related to the construction plan, and may include information related to material placement.

Further, the construction system according to the embodiment of the present disclosure is a construction system that assists the preparation of a construction plan. For example, as illustrated in FIG. 11, the construction system includes the non-volatile storage device NM, the information input device MD3 as the information obtaining device E1 for obtaining information related to construction, and the controller MD4 as a control device to control the notification device that is at least one of the display MD1 or the sound output device MD2. The controller MD4 is configured to operate the notification device when the dangerous situation is determined to occur based on the information obtained by the information input device MD3 and the danger information database DB as a database stored in the non-volatile storage device NM. According to this configuration, because the construction system can determine whether the dangerous situation will occur at a stage of preparation of the construction plan, an actual occurrence of the dangerous situation can be prevented.

The preferred embodiment of the present disclosure has been described in detail above. However, the present disclosure is not limited to the embodiments described above. Various modifications, substitutions, or the like can be applied to the above-described embodiments without departing from the scope of the present disclosure. Further, the features described separately can be combined as long as there is no technical conflict.

What is claimed is:

1. A shovel comprising:
   a lower traveling structure;
   an upper swing structure rotatably mounted on the lower traveling structure; and
   an information obtaining device that obtains information related to construction, the information obtaining device including a sensor that captures an image related to a construction site; and
   processing circuitry that inputs image data of the captured image to a learned model subjected to machine learning to:
   process the input image data to identify types of objects included in the captured image,
   predict probabilities of presence of the objects of the identified types,
   predict probabilities of assumed scenes of the construction site based on the predicted probabilities of the objects of the identified types and a relative positional relationship between the objects of the identified types, and
   determine a scene of the construction site based on the predicted probabilities of the assumed scenes,
   wherein the processing circuitry further calculates a danger level of the determined scene of the construction site based on a type of the determined scene and generates an image to be displayed by superimposing the predicted probabilities of presence of the objects of the identified types, a predicted probability of the type of the determined scene, and the calculated danger level on the captured image.

2. The shovel according to claim 1, wherein
   the processing circuitry further derives a relative positional relationship between a plurality of objects present around the shovel from the information obtained by the information obtaining device, and estimates a future construction situation after passage of a predetermined time since a current time based on the derived relative positional relationship.

3. The shovel according to claim 2, wherein the processing circuitry determines future occurrence of a dangerous situation based on the estimated future construction situation.

4. The shovel according to claim 1, wherein the information related to construction includes an image of surroundings of the shovel.

5. The shovel according to claim 1, wherein the information related to construction includes information related to a construction plan.

6. The shovel according to claim 1, wherein the information related to construction includes information related to material placement.

7. A construction system comprising:
   a sensor that captures an image related to a construction site; and
   processing circuitry that inputs image data of the captured image to a learned model subjected to machine learning to:
   process the input image data to identify types of objects included in the captured image,
   predict probabilities of presence of the objects of the identified types,
   predict probabilities of assumed scenes of the construction site based on the predicted probabilities of the objects of the identified types and a relative positional relationship between the objects of the identified types, and
   determine a scene of the construction site based on the predicted probabilities of the assumed scenes,
   wherein the processing circuitry further calculates a danger level of the determined scene of the construction site based on a type of the determined scene and generates an image to be displayed by superimposing the predicted probabilities of presence of the objects of the identified types, a predicted probability of the type of the determined scene, and the calculated danger level on the captured image.

8. The shovel according to claim 1, wherein
   the processing circuitry further determines whether to execute an operation according to a type and a position of an object identified based on an output of a space recognition device.

* * * * *